(12) United States Patent  (10) Patent No.: US 7,614,360 B2
Muniga et al.  (45) Date of Patent: Nov. 10, 2009

(54) BREADING MACHINE

(75) Inventors: Scott M. Muniga, Oberlin, OH (US);
Jeffrey A. Whited, Amherst, OH (US);
Lane Bettcher, Huron, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 696 days.

(21) Appl. No.: 11/235,299

(22) Filed: Sep. 26, 2005

(65) Prior Publication Data

US 2006/0032384 A1  Feb. 16, 2006

Related U.S. Application Data

(63) Continuation-in-part of application No. 10/856,248, filed on May 28, 2004, now Pat. No. 7,296,531.

(60) Provisional application No. 60/498,919, filed on Aug. 29, 2003.

(51) Int. Cl.
*A23G 3/20* (2006.01)
(52) U.S. Cl. .......................... 118/16; 118/30
(58) Field of Classification Search .............. 118/13, 118/26, 16, 30, 18, 31, 425; 99/494; 198/832, 198/835, 838
See application file for complete search history.

(56) References Cited

U.S. PATENT DOCUMENTS

| | | |
|---|---|---|
| 895,856 A | 8/1908 | Harton |
| 910,812 A | 1/1909 | Harton |
| 2,509,533 A | 5/1950 | Schoen, Jr. |
| 2,855,893 A | 10/1958 | Greer et al. |
| 2,865,766 A | 12/1958 | Christiansen et al. |
| 3,404,659 A | 10/1968 | Croston |
| 3,547,075 A | 12/1970 | Johnson |

(Continued)

FOREIGN PATENT DOCUMENTS

EP  1316261 A2  6/2003

OTHER PUBLICATIONS

PCT International Search Report for PCT/US2004/018362, dated Jun 21, 2005.

(Continued)

*Primary Examiner*—Brenda A Lamb
(74) *Attorney, Agent, or Firm*—Tarolli, Sundheim, Covell & Tummino LLP

(57) ABSTRACT

A breading machine has a battering unit for applying a fluent batter to a food product. The battering unit includes a batter reservoir and a battering unit conveyor system for delivering food products from said batter reservoir to a battering unit conveyor discharge section that propels the food product from the battering unit. The combination units also include a breading unit for receiving food product from an associated battering unit. The breading unit includes a breading reservoir and breading unit conveyor system for applying particulate breading to the food product at a breading station by moving breading material from the breading material reservoir and food product coated with the batter to the breading station. A conveyor drive system includes a machine housing and a drive unit rotatably supported by the machine housing that provides motive power to the breading unit conveyor. A breading unit drive is coupled to the breading unit conveyor and is rotated by the drive unit to move said breading unit conveyor.

20 Claims, 21 Drawing Sheets

U.S. PATENT DOCUMENTS

| | | |
|---|---|---|
| 3,589,274 A | 6/1971 | Murray |
| 3,735,726 A | 5/1973 | Buttler |
| 3,739,743 A | 6/1973 | McKee, Jr. |
| 3,885,519 A | 5/1975 | Orlowski |
| 3,915,116 A | 10/1975 | Booth |
| 3,967,583 A | 7/1976 | Booth |
| 4,023,521 A | 5/1977 | Booth |
| 4,497,244 A | 2/1985 | Koppens |
| 4,662,306 A | 5/1987 | Miller |
| 4,808,424 A | 2/1989 | Wadell |
| 5,020,427 A | 6/1991 | Kennefick et al. |
| 5,052,330 A | 10/1991 | Stacy |
| 5,160,377 A | 11/1992 | Montemayor et al. |
| 5,226,354 A | 7/1993 | Stewart |
| 5,236,502 A | 8/1993 | Wadell |
| 5,238,493 A | 8/1993 | Miller |
| 5,284,514 A | 2/1994 | Griffiths |
| 5,318,629 A | 6/1994 | Raque et al. |
| 5,463,938 A | 11/1995 | Sarukawa et al. |
| 5,514,399 A | 5/1996 | Cordera et al. |
| 5,643,361 A | 7/1997 | Wadell |
| 5,664,489 A | 9/1997 | Herrick, IV |
| 5,707,448 A | 1/1998 | Cordera et al. |
| 5,924,356 A | 7/1999 | Harper et al. |
| 6,183,792 B1 | 2/2001 | Bettcher et al. |
| 6,244,170 B1 | 6/2001 | Whited et al. |
| 6,269,739 B1 | 8/2001 | Bettcher et al. |
| 6,506,993 B1 * | 1/2003 | Gronemann et al. ........ 218/154 |
| 2003/0097939 A1 | 5/2003 | Riubrugent |

OTHER PUBLICATIONS

"SBB Batter—Breader," Bettcher Industries, Inc., Feb. 1997, 1 sheet.
"The No Paper Continuous Hot Oil Filter," Sam Stein Associates, Inc., Feb. 1997, 1 sheet.
PCT Written Opinion of the International Searching Authority for PCT/US2004/018362, dated Mar. 9, 2006.

* cited by examiner

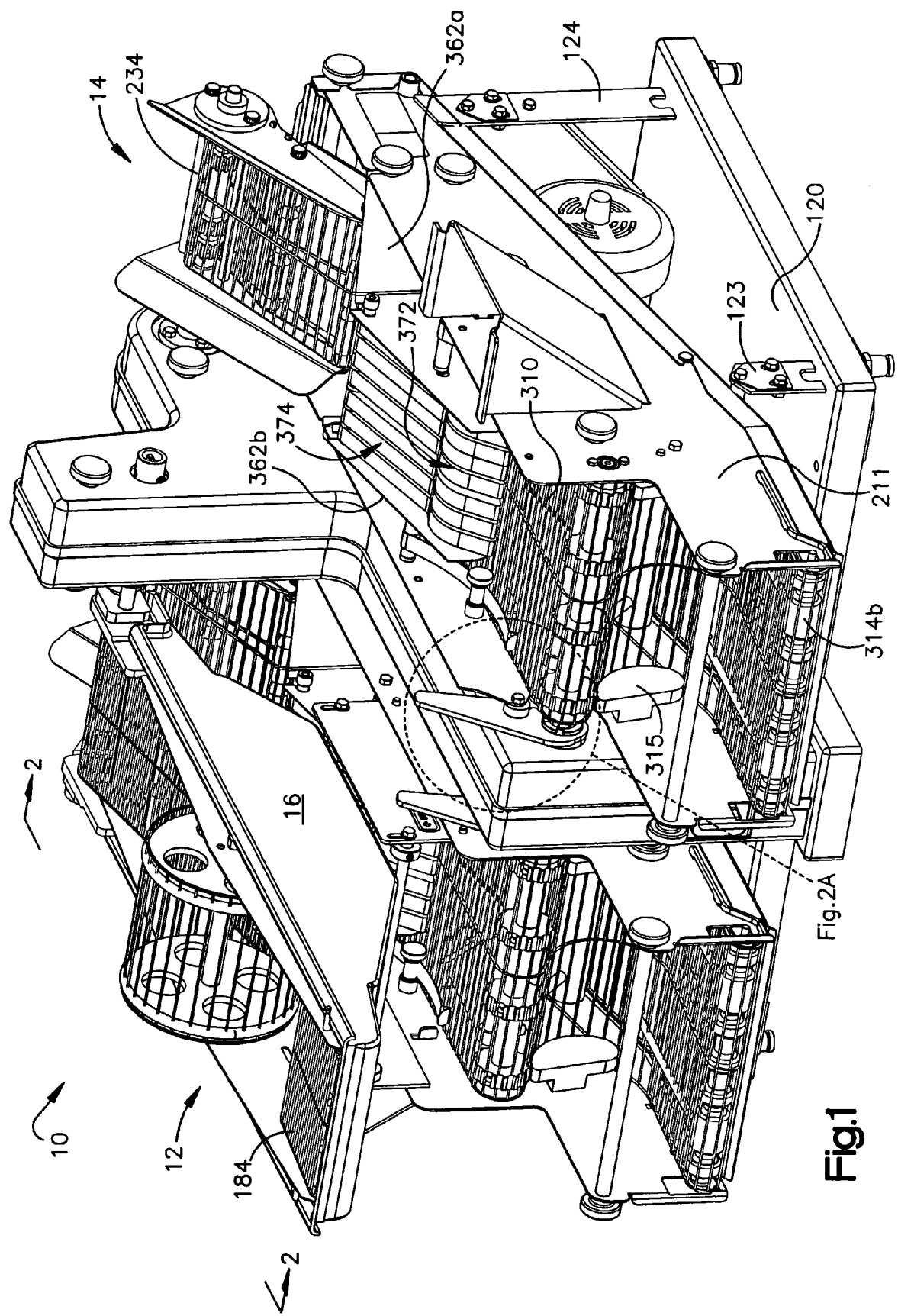

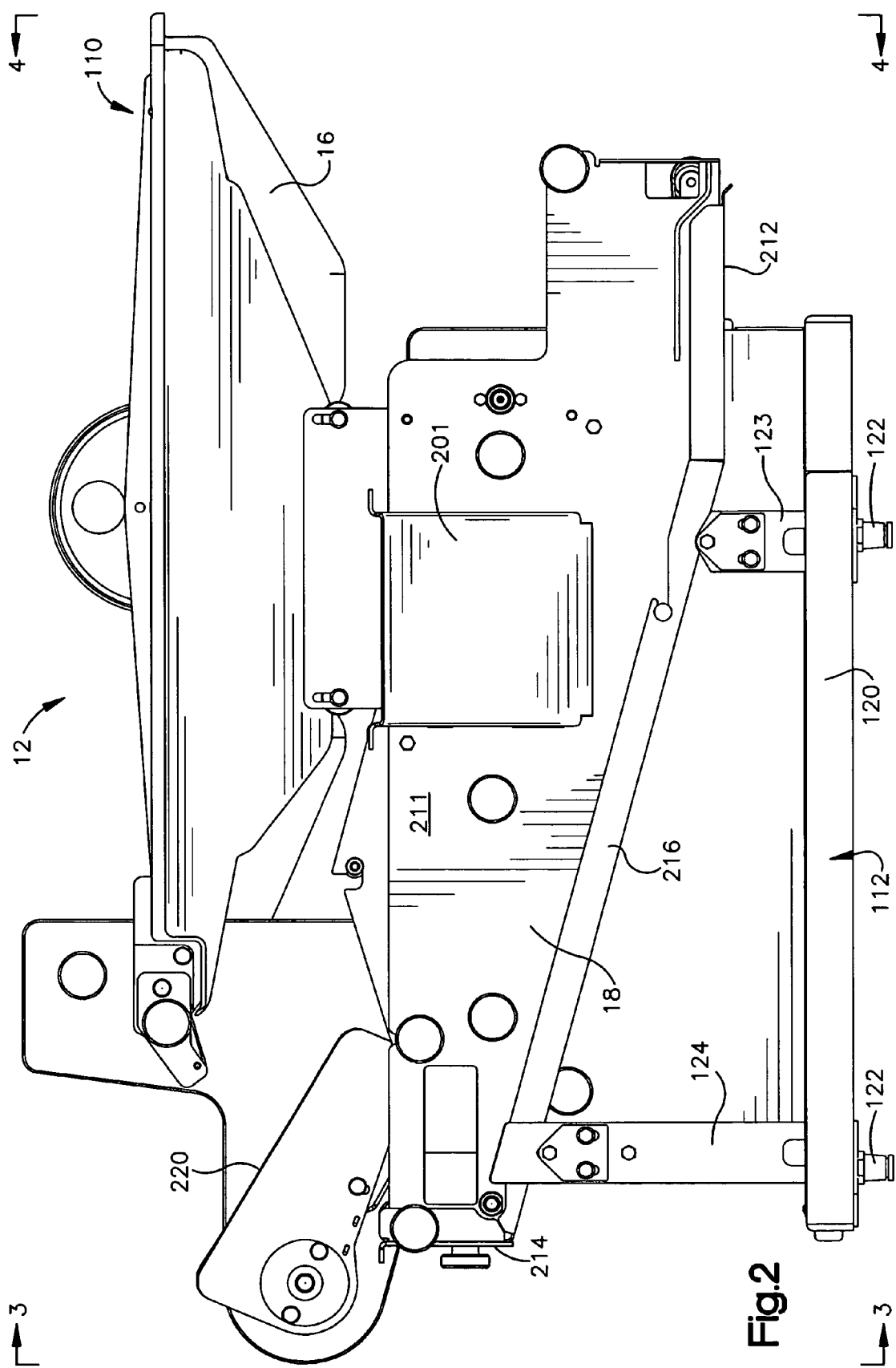

BREADING MACHINE

RELATED APPLICATION

The present application is a continuation in part application of U.S. patent application Ser. No. 10/856,248, filed May 28, 2004, now U.S. Pat. No. 7,296,531, which claims priority from pending U.S. provisional application Ser. No. 60/498, 919 entitled "Improved Breading Machine" that was filed in the U.S. Patent and Trademark office on Aug. 29, 2003.

FIELD OF THE INVENTION

The present invention relates to food product breading machines and more particularly to food product breading machines that are used to coat flaccid products with particulate breading materials.

BACKGROUND OF THE INVENTION

Flaccid food products, such as fish filets and chicken tenders, and delicate, frangible products, like croquettes, are typically breaded and fried for consumption by restaurant customers. These products, together with other foods that are fried, are frequently produced and consumed in volumes sufficient to justify in-restaurant use of machinery that batters and then coats the products with particulate breading material.

The prior art machinery used for breading food products functioned for both relatively rigid products, like bone-in chicken parts, onion rings, etc., and the noted flaccid products. The machines in question utilized open mesh wire conveyor belts that carried the products through the machinery. The machines often comprised a battering unit, where the products were coated with a fluent batter, and a breading unit where breading was applied to the product and adhered to the batter coating. The battering units had a conveyor belt that delivered battered products to a breading unit conveyor belt before the breading was applied.

Machines have been constructed with the battering unit supported vertically above the breading unit. The battering and breading units were oriented so that a single attendant, at one end of the machine, could load items into the battering unit and receive the items, breaded, from the breading unit. This was a particularly effective way to bread food products to order, as the attendant could load the number of items constituting an order into the machine, receive the breaded items and fry them at once. The superposed battering and breading units also provided a small "footprint" that minimized the space occupied by the machine.

These machines were not without drawbacks. The unit conveyors were spaced vertically apart and configured so that battered items dropped from one conveyor to the other. Flaccid and frangible products, like fish filets, chicken tenders, and croquettes, presented problems. Flaccid products were often folded or heaped on the breading unit conveyor when breading was applied. Consequently, some flaccid products were only partially breaded while others were unevenly coated. Frangible products were sometimes broken up when dropped from one conveyor to the other. Relatively rigid products were more effectively handled although they sometimes landed roughly on the breading unit conveyor material and the impacts sometimes created clouds of breading and spillage.

The battering and breading machine that is disclosed in U.S. Pat. No. 5,924,356 overcame the handling problems associated with flaccid and frangible food items, as well as rough handling of dimensionally stable items, by locating the battering unit laterally spaced from and in-line with the breading unit. The battering unit conveyor was positionable adjacent the breading unit conveyor so that flaccid and frangible items were handed-off to the breading conveyor without folding, heaping, or breaking up. The machine had a relatively large footprint and required the attendant to load items into the end of the machine that was opposite from the discharge end. This required sufficient floor space for the attendant to move around the machine from one end to the other.

Another problem with the prior art breading units was that after breading material was applied, the food products often carried breading material that was either loose, or only weakly adhered to the product. Food products carrying such breading were delivered from the breading units and placed in fryers where the breading was dislodged. This material was sometimes later be adhered to food products during frying, creating unappealing appearance and flavor.

Unloading breading material from prior art breading machines has sometimes been difficult. Some prior art machines were constructed in such a way that the entire breading reservoir had to be physically removed from the machine in order to dump the breading material. Some reservoirs were equipped with trap doors that allowed breading material to fall from the reservoir while others utilized panels that were moved into position under conveyors so that the breading could be conveyed along and discharged from the machines at a discharge location. The prior art machines were constructed for discharging breading material from machines that had particular architectures. For example, where the machines had a distinct reservoir that was located at an elevated location trap doors enabled dumped breading to be collected under the reservoir. Where the under-conveyor panels were used, the machines had a discharge location for food products that also served as the discharge location for the breading material.

Issued U.S. Pat. No. 6,244,170 to Whited et al. concerns a new and improved food product breading machine that reliably conveys flaccid and frangible food products to a breading station without folding, heaping or breakage. The disclosure of the '170 patent to Whited et al is incorporated herein by reference. The present invention concerns improvements to the apparatus disclosed in the '170 patent to Whited et al.

As disclosed in the '170 patent, the breading machine had a reservoir that was mounted to pins or posts supported by a base plate. The reservoir included a drive roller for a breading conveyor that was activated by a motor positioned to the side of the reservoir and connected to the drive roller by a transmission. The entire reservoir could be removed by decoupling the drive roller and motor. Due to the angled base of the reservoir, its engagement produced a side force against the coupling between motor and the reservoir drive roller.

A latching system for coupling the reservoir to the drive motor consisted of a latch that was mounted on the breader reservoir, rotated downward over the coupling. This system works well in eliminating the breader reservoir from moving side-to-side axially but does nothing for supporting the breader load vertically. Also the latch had a tendency to ride up out of its groove causing the breader to become disengaged during operation, resulting in break in production.

Because the breading machine is used to batter and bread food products in restaurants, it is important for the components to easily come apart for cleaning. A prior art method of driving the breader section is through what is called a segmented shaft. The segmented shaft has two ears called segments, which engage the driven shaft. This method of driving the breader allows for relatively simple engagement of the drive and driven sections.

There are problems associated with this type of drive due to the fact that the two shafts need to be perfectly aligned to prevent shaft wear and premature bearing failure. Another problem with this type of drive is that the drive and driven shafts have only two mating locations.

SUMMARY OF THE INVENTION

The present disclosure concerns a machine for coating food products with a particulate breading material. The machine includes a battering unit for applying a fluent batter to a food product comprising a batter reservoir and a battering unit conveyor system for moving food products through the batter reservoir and then discharging food product from the battering unit.

A breading unit applies particulate breading to the food product after the food product moves through the battering unit and includes a breading material reservoir, a breading station at which breading is applied to the product, and a breading unit conveyor for delivering food products received from the battering unit to the breading station.

A conveyor drive system includes a drive unit rotatably supported by a machine housing that provides motive power to said breading unit conveyor and a breading unit drive coupled to the breading unit conveyor. The breading unit drive is rotated by the drive unit to move said breading unit conveyor. One or the other of the drive unit and breading unit drive defines a bore and another of said drive unit and breading unit drive defines a conforming outer surface sized to fit into said bore.

In one exemplary embodiment, a drive and driven shafts engage each other by a floating coupling that allows slight misalignment in mutually orthogonal directions. This improved engagement structure permits engagement of the drive and driven shafts while the machine drive is running.

Other features and advantages of the invention will become apparent from the following description and from the accompanying drawings, which form part of the specification, and wherein:

BRIEF DESCRIPTION OF THE DRAWINGS

FIG. 1 is a perspective view of an exemplary embodiment of a food product breading machine having side by side battering/breading units;

FIG. 2 is a side elevational view of the food product breading machine of FIG. 1;

DESCRIPTION OF THE BEST MODES CONTEMPLATED OF CARRYING OUT THE INVENTION

Figure 2A:
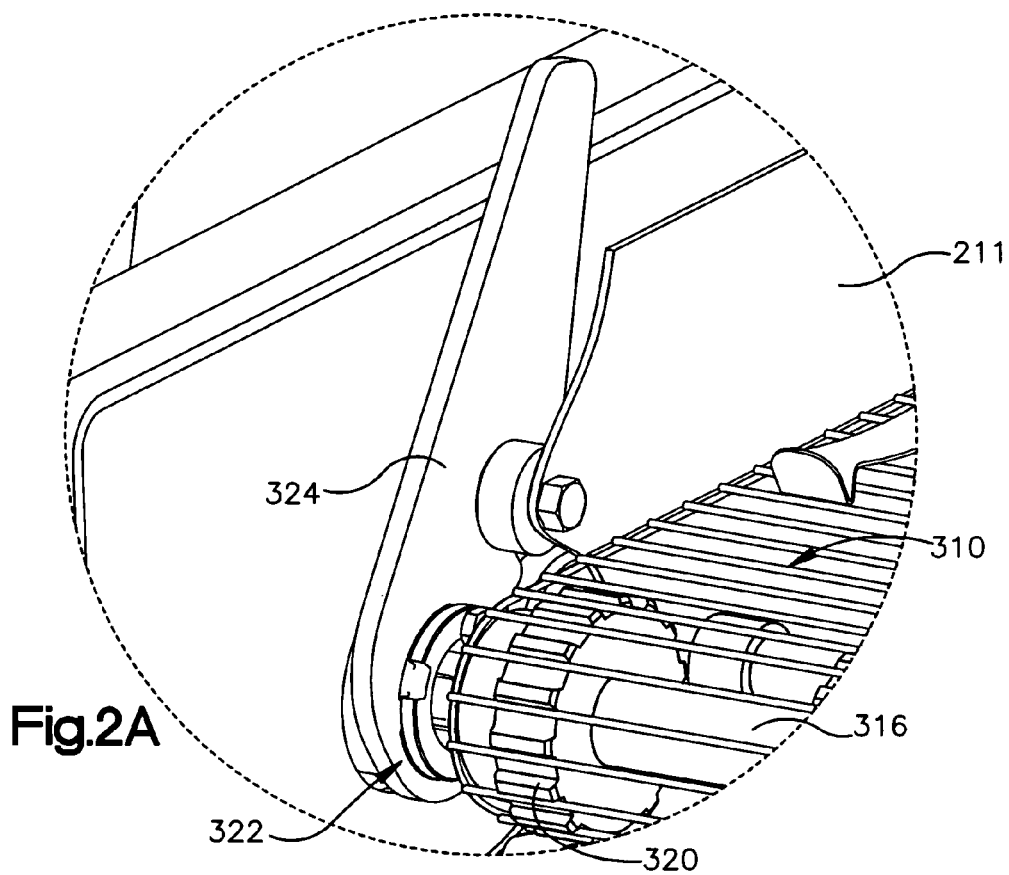
FIGS. 2A-2E are views showing a locking latch system.

A food product breading machine 10 constructed according to the invention is illustrated in the drawings. The machine 10 is especially useful in restaurants where individual food products that are flaccid, such as chicken tenders, fish filets, etc., or frangible, such as croquettes, are fried to order. The machine 10 coats individual food items with a fluent batter and then overcoats them with a particulate breading material that clings to the batter. The breaded items are discharged from the machine in condition for frying.

The exemplary embodiment of the invention depicted in FIGS. 1-4 is a breading machine 10 that has first and second combination battering/breading units 12, 14 positioned in close proximity to each other. In the exemplary embodiment of the invention the units 12, 14 are positioned in side by side relation to each other.

Each of the combination units 12, 14 has a battering unit 16 for applying a fluent batter to a food product. The battering unit includes a batter reservoir and a battering unit conveyor system for delivering food products from said batter reservoir to a battering unit conveyor discharge section that propels the food product from the battering unit. Each combination unit also includes a breading unit 18 positioned beneath the battering unit 16 for receiving food product from an associated battering unit. The breading unit includes a breading reservoir and breading unit conveyor system for applying particulate breading to the food product at a breading station by moving breading material from the breading material reservoir and food product coated with the batter to the breading station.

A drive motor 20 is coupled through respective first and second transmissions 22, 24 to provide motive power to the conveyor systems of each of the first and second combination battering/breading units for moving food products simultaneously through the combination battering/breading units.

Use of this configuration food coating machine allows different types of foods to be simultaneously prepared in the two side by side units 12, 14.

Figure 5:
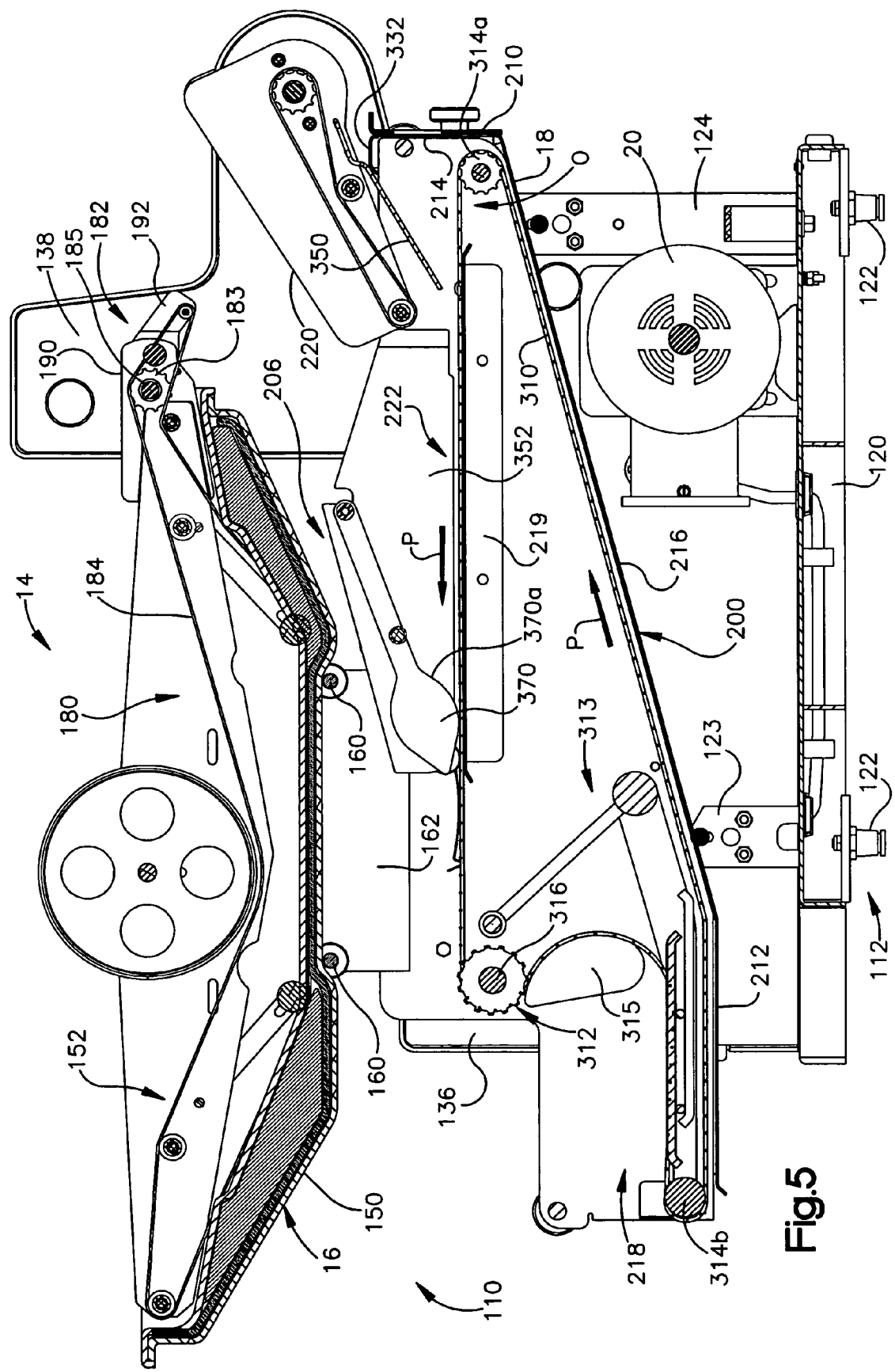
FIG. 5 is a side elevational view of the food product breading machine of FIG. 1 with parts removed.

The combination unit 14 (FIG. 5) is configured with the battering unit 16 stacked on top of the breading unit 18. Food items are placed in the battering unit at one end 110 of the unit, conveyed in a generally horizontal direction through the battering unit, and delivered to the breading unit. The food items from the battering unit are conveyed through the breading unit in the opposite direction and discharged from the machine at the same end 110 where they are collected for frying. The machine attendant can thus feed food products constituting an order into the machine and receive the breaded products from the machine without having to change position. The breaded items can be accumulated in a frying basket and immediately placed in a fryer (or in the instance of two products that are prepared simultaneously in separate fryers). The relatively small area occupied by the machine 10 enables it to be positioned on a table top or counter adjacent a fryer if desired.

Each of the illustrated combination units has a base frame 112 that is constructed and arranged so that the battering and breading units 16, 18 are detachably supported and easily removable for cleaning without requiring the use of hand tools. In the illustrated embodiment, the base frame 112 comprises a base plate 120, support legs 122, and support structures 123, 124 that extend upwardly from the base plate and bear the weight of both the breading and battering units. The illustrated support structures 123, 124 are formed by respective pairs of sheet metal stanchions that have supporting cross bars extending between their respective upper ends and on which the breading unit 18 rests. The stanchions pairs frictionally grip the breading unit 18. The unit 18 is removable for cleaning, etc. by lifting it from the cross bars. The legs 122 are sized so that the machine 10 may be placed on a table top or counter during use.

Figure 7:
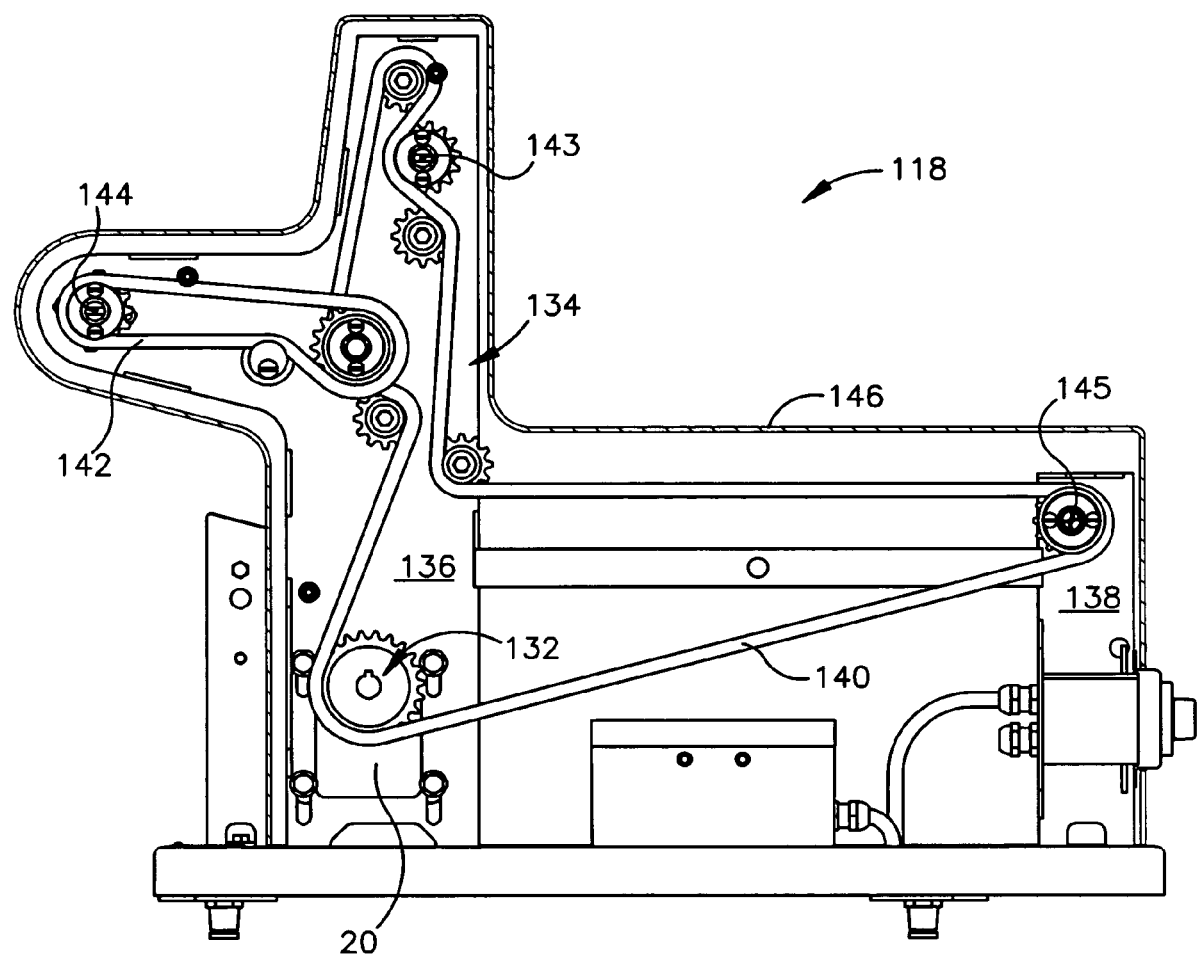
FIG. 7 is a schematic depiction of a drive transmission of the FIG. 1 machine.
Figure 8:
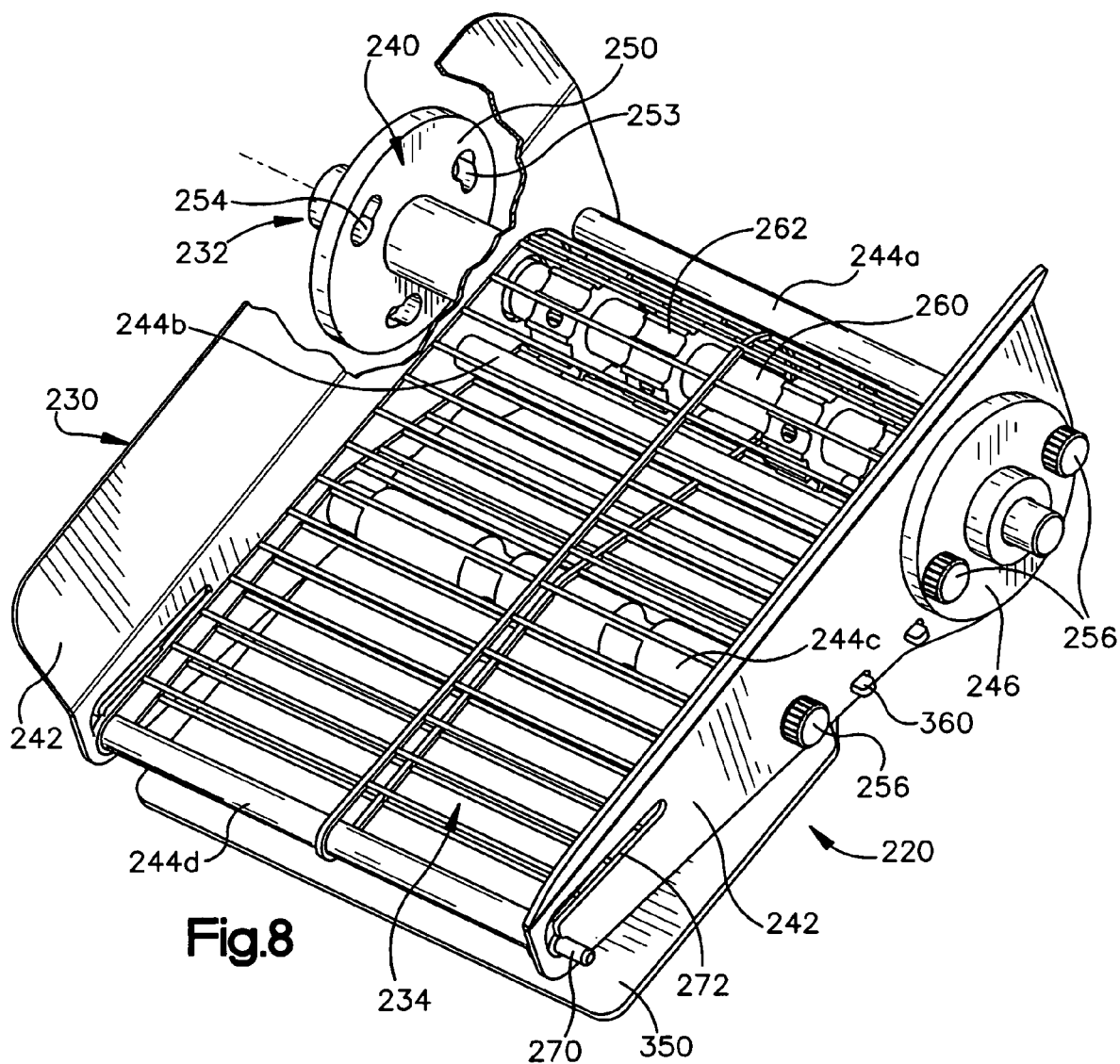
FIG. 8 is a perspective view of one conveyor of a breading unit of the machine of FIG. 1.
Figure 9:
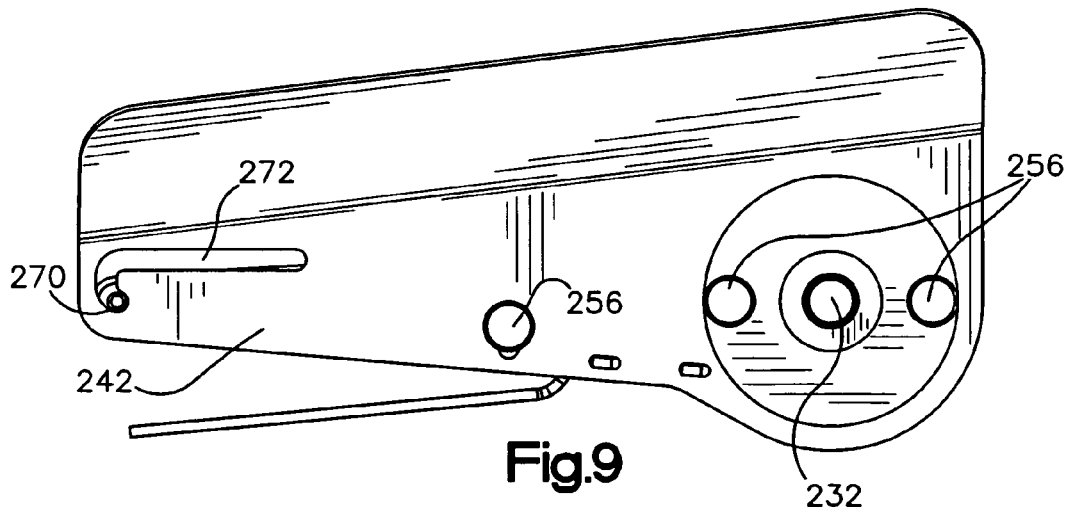
FIG. 9 is a side elevational view of the conveyor of FIG. 8.

A drive system 118 (FIG. 7) is constructed and arranged to drive food product conveyor systems associated with the two pairs of battering and breading units 16, 18 so that food products are conveyed substantially continuously through the machine 10. The illustrated drive system 118 comprises a drive motor 20, a drive transmission 132 (FIG. 7) between the motor and the unit conveyor systems, and a tower arrangement 134 for supporting the transmission 132. The tower arrangement comprises towers 136, 138 that are anchored to and spaced apart along the base plate 120. The towers 136, 138 are illustrated as relatively thick steel plates. The motor 20 is anchored to the tower 136 and drives the transmission through a gear reduction and an output shaft that is supported by bearings in the tower 136. The drive transmission 132 is illustrated as a chain drive comprising two drive chains 140, 142 and shafts and sprockets that run in mesh with the drive chains and are rotatably supported by the towers 136, 138. The towers 136, 138 rotatably support drive shafts 143, 144, 145 each carrying a driving sprocket at extending through bearings in the associated tower plates to transmit power to the breading and battering unit conveyor systems described below. A chain guard structure 146 (FIG. 7) encloses the tower arrangement and drive transmission 132. The motor 20 is illustrated as an electric motor. Since two side by side units are utilized, each end of the shafts 143, 144, 145 are exposed on opposite sides of the tower for coupling to a respective conveyor as described more completely below.

The illustrated battering unit 16 receives food items placed on a conveyor by an attendant, completely immerses the items in a batter pool, enables excess batter to be shed from the items and delivers the battered items to the breading unit 18.

A battering unit 16 similar to the unit depicted in the drawings is illustrated in FIGS. 1 and 2 is described and illustrated in U.S. Pat. No. 5,924,356 and the illustrations and description there are incorporated herein in their entireties by this reference to that patent.

The battering unit 16 comprises a batter reservoir 150 and a battering unit conveyor system 152. The battering unit conveyor system 152 is supported by the batter reservoir 150 and operated by the drive system 118 to move food products through the batter reservoir and deliver them to the breading unit 18.

The batter reservoir 150 is illustrated in the form of an open top tank with the battering conveyor system 152 occupying the tank. The conveyor system 152 moves food items placed in the unit 16 at the machine end 110 through a batter pool in the tank and delivers food items from the tank into the breading unit. The batter reservoir is seated atop the breading unit 18. In the illustrated machine 10 the reservoir rests on a pair of support rods 160 that extend between supporting plates 162 that project upwardly from the breading unit 18. The battering reservoir, with its contents, is lifted off the support rods for cleaning and maintenance.

The illustrated conveyor system 152 comprises a food product battering section 180, a product delivery conveyor section 182 projecting from the tank downwardly toward the breading unit, and a conveyor driving assembly 183 coupled to the drive transmission 132 by means of the power output shaft 143. The conveyor sections 80, 82 share a common conveyor "belt" 184. The belt supports the food items over minimal contact areas to maximize contact between food products and the batter while minimizing the amount of batter remaining on the conveyor belt after passing through the batter pool.

The illustrated belt 184 is fabricated from linked metal wires forming a wide mesh, screen-like chain that extends substantially across the lateral width of the reservoir. The illustrated driving assembly 183 comprises a drive shaft 185 that extends laterally across the conveyor at the juncture of the sections 180, 182. The shaft carries belt driving sprocket wheels spaced apart between the sides of the battering conveyor and the input shaft 143 driven by the transmission 132. The shaft 185 is detachably connected or coupled to the drive shaft 143 by telescoping the shaft ends together in driving relationship (not illustrated). The shafts can be disconnected manually by a machine attendant when the battering unit is removed for cleaning or replacement. The driving connection can be formed by a female shaft end forming a slot and a conforming tooth on the other male shaft end, by male and female splines, etc. While a wire mesh conveyor belt 184 is illustrated, any suitable form of conveyor could be employed.

The battering conveyor section 180 extends between the reservoir entrance and discharge while the battering conveyor delivery section 182 projects from the battering section 180 for delivering battered food items to the breading unit 18. The delivery section comprises a manual adjustment mechanism 190 and a delivery conveyor end section 192 projecting from the mechanism 190. The end section 192 cooperates with the adjustment mechanism such that the projecting conveyor end is adjustably positionable vertically relative to the breading unit.

The adjustment mechanism 190 enables the machine attendant to manually reposition the conveyor end section 192 to accommodate food products having differing thicknesses.

The breading unit 18 comprises a breading material reservoir 200, a breading unit conveyor system for moving food products. The conveyor system also moves breading material along a travel path P through the breading material reservoir 200. The conveyor system also both breading and food product to a breading application station 206. A breading material flow controlling system 208 operates so that food products conveyed through the station 206 pass through a standing wave of breading material. A breading discharge mechanism 210 directs breading material out of the reservoir when the breading unit is being emptied of breading material.

The reservoir 200 is constructed and arranged so that breading material that is not applied to food items passing through the station 206 is recirculated through the reservoir by the conveyor system. The reservoir 200 is illustrated as an open top hopper-like construction defining parallel side walls 211, a horizontal base section 212, an end wall 214 beneath the battering conveyor end section, and an upwardly sloped bottom wall 216 extending between the horizontal base section 212 and the end wall 214. The reservoir end 218 corresponding to the machine end 110 is open so that food products discharged from the machine pass through the open end 218 adjacent the base wall section 212. A breading supporting panel 219 extends across the reservoir between the end wall 214 and the breading station 206. The illustrated reservoir 200 is constructed from sheet stainless steel and is detachably secured to the base frame 112 so that the reservoir is manually removable from the base frame without using tools.

The reservoir 200 holds a quantity of breading material and delivers the breading material at a controlled rate due to operation of the breading unit conveyor described below. Breading material is added to the reservoir by means of a side chute 201 attached to the side wall 211 and illustrated in more detail in FIGS. 12-16. The chute 201 is constructed of sheet metal that is bent to define a sloped wall 202a, and two triangular shaped side walls 202b, 202c. During assembly of the reservoir 200, the chute is attached to a side wall 211 by means of mounting tabs 203 that engage slots in the side wall 211. The sloped wall 202a ends in a straight edge 204 that fits into a bottom of a rectangular hole in the side wall 211 sized to accommodate the chute 201. In the exemplary embodiment of the invention the hole has dimensions of approximately 6.2 by 2.6 inches. The width dimension of the chute is slightly greater than the width (6.2 in) of this opening.

The breading unit conveyor system propels the food items and breading material along a travel path P and recirculates the breading material through the reservoir 200. The illustrated breading unit conveyor system comprises first and second food product conveyor sections 220, 222 for conveying food products received by the breading unit conveyor system downwardly and horizontally to the breading station 206 and thereafter out of the breading unit at the machine end 110. The first, food product receiving conveyor section 220 is located adjacent and below the distal end of the battering unit conveyor and is positioned vertically above the level of the breading station 206 and horizontally spaced from the breading station. The second food product conveyor section 222 receives food product from the first conveyor section 220, propels breading material and food products generally horizontally across the breading support panel 219, through the breading station 206, discharges breaded food products from the unit 18, and recirculates unused breading through the reservoir 200.

The conveyor section 220 (See FIG. 8) receives food products from the battering unit conveyor system, reverses the products' direction of travel and delivers the food products to the conveyor section 222. The conveyor section 220 is angled downwardly so that the food products delivered to it from the battering conveyor are delivered gently onto the conveyor section 222 for movement through the breading station. Referring to FIGS. 8-11, the conveyor section 220 comprises a framework 230, a drive shaft assembly 232 detachably connected to the transmission 132, and a conveyor belt 234 driven by the shaft assembly 232. The illustrated belt 234 is constructed like the belt 184 but may be of any suitable construction.

The framework 230 supports the drive shaft assembly 232 and the conveyor belt 234. The framework 230 comprises a supporting hub 240, laterally spaced side frame members 242, transverse tie rods 244a-d that extend between and support the side frames, and a drive shaft bearing assembly 246 that supports the tie rods 244a, 244b and the shaft assembly end on an opposite side of the framework spaced from the hub 240.

The supporting hub 240 is a tubular member into which the shaft assembly 232 extends and which cantilevers the framework 230 to the tower 136. The hub 240 is formed by a tubular cylindrical body having outwardly extending flanges at its opposite ends. An outermost of the flanges 250 defines a plurality of circumferentially spaced keyhole slots 253 that receive respective headed studs 254 that are fixed to the tower 136. In one embodiment, the studs 254 are carried by a flanged tube that is fixed to the tower 136 by suitable fasteners and encircles the drive shaft 144 that projects from the side of the tower to engage the drive shaft assembly 232. A second hub flange (not shown) is fastened to the side frame 242.

The side frames 242 are illustrated as sheet metal members that extend along respective opposite sides of the conveyor belt 234. The tie rods 244a-c extend between the side frames and are secured in place by thumb screws 256 that clamp each end of each tie rod to a respective side frame member. In the illustrated machine three tie rods 244a-244c have threaded openings in each end, each of which receives a thumb screw that extends through a hole in the adjacent side frame. The head of each thumb screw bears on the side frame to clamp the side frame and tie rod together. The tie rods 244a, 244b are clamped between the side frames, the hub flange 252 and the bearing assembly 246.

The shaft assembly 232 is driven from the chain drive and supported for rotation between the hub 240 and the bearing assembly 246. The illustrated shaft assembly comprises a shaft member 260 and belt driving sprockets 262 that are attached to the shaft member. The shaft member end that projects through the hub 240 is supported in a bearing mounted in the hub and telescopes into driving relationship with the drive shaft 144 when the conveyor section 220 is assembled to the tower 134

Figure 10:
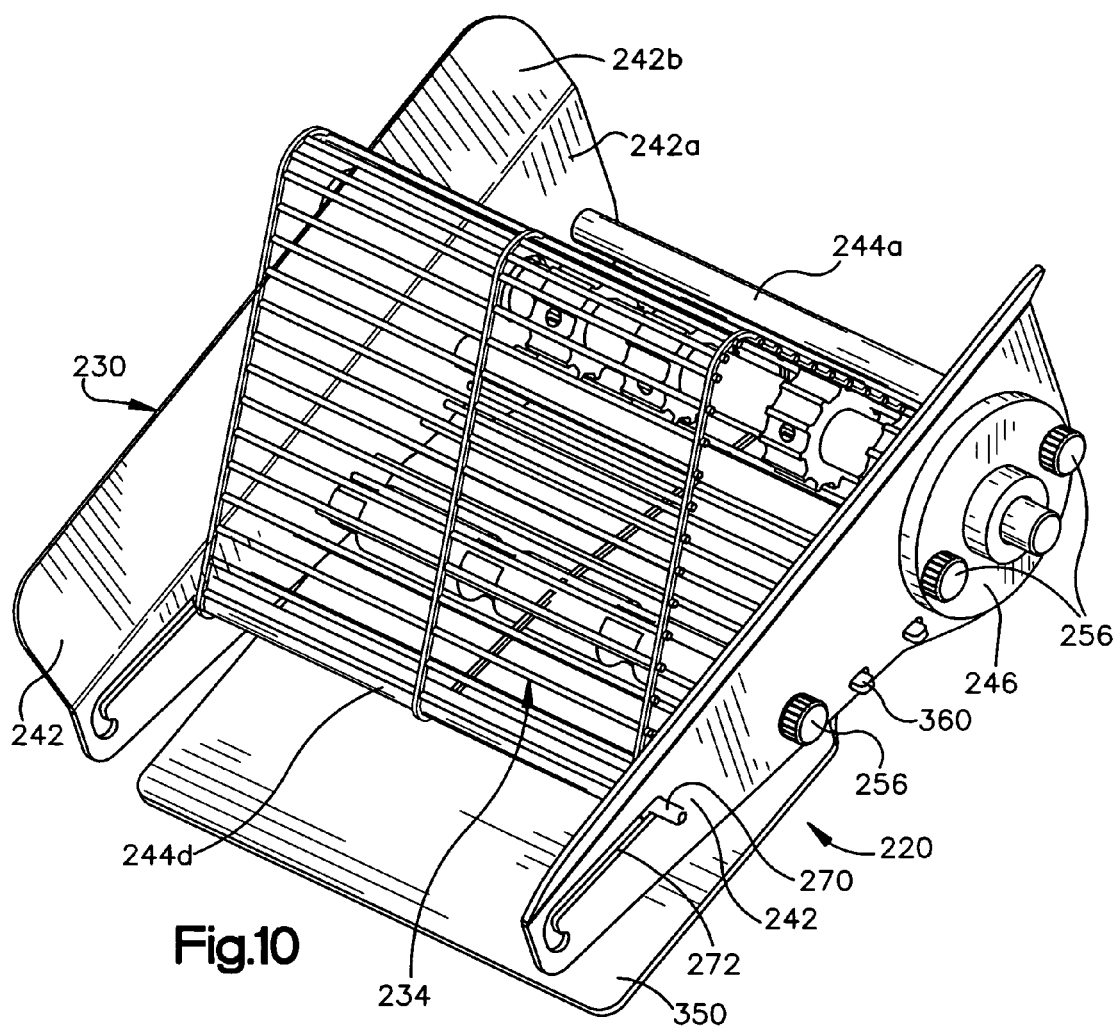
FIG. 10 is a perspective view of the conveyor of FIG. 8 with parts moved to an alternate position.
Figure 11:
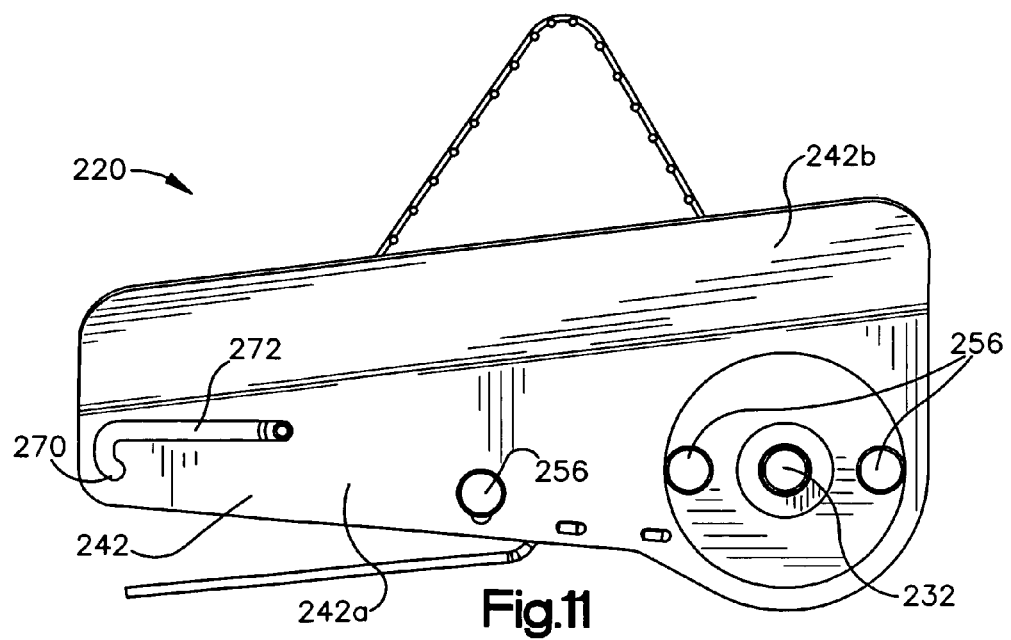
FIG. 11 is a side elevational view of the conveyor depicted in FIG. 10.
Figure 12:
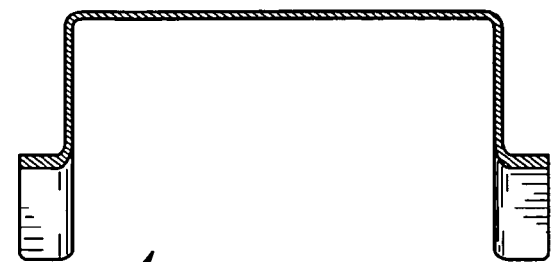
FIGS. 12-16 are alternate view of a bread chute for adding breading to the machine of FIG. 1.
Figure 13:
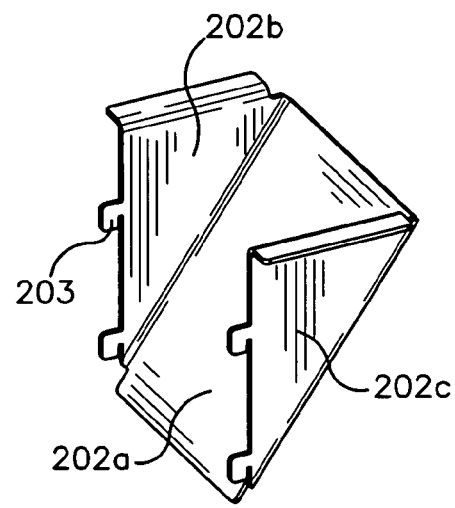
Figure 14:
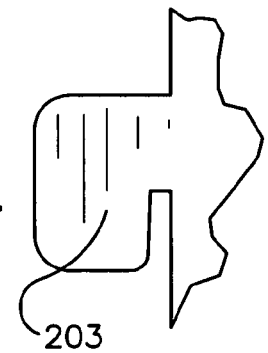
Figure 15:
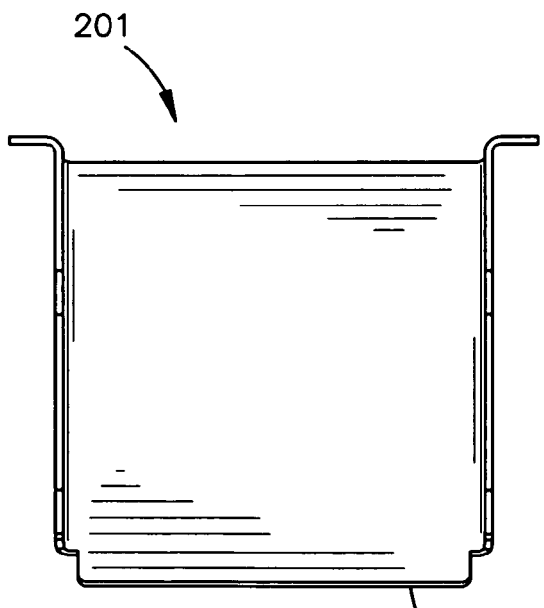
Figure 16:
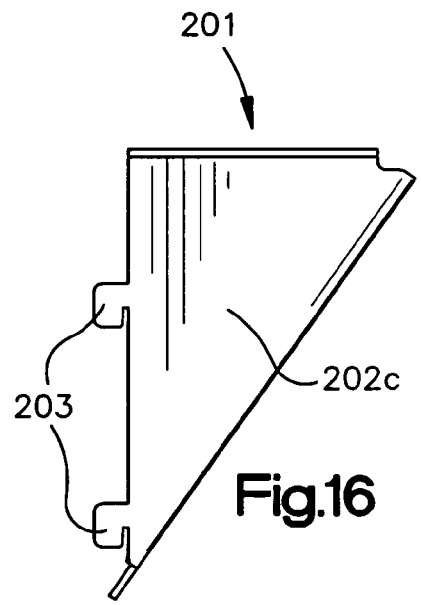
Figure 17:
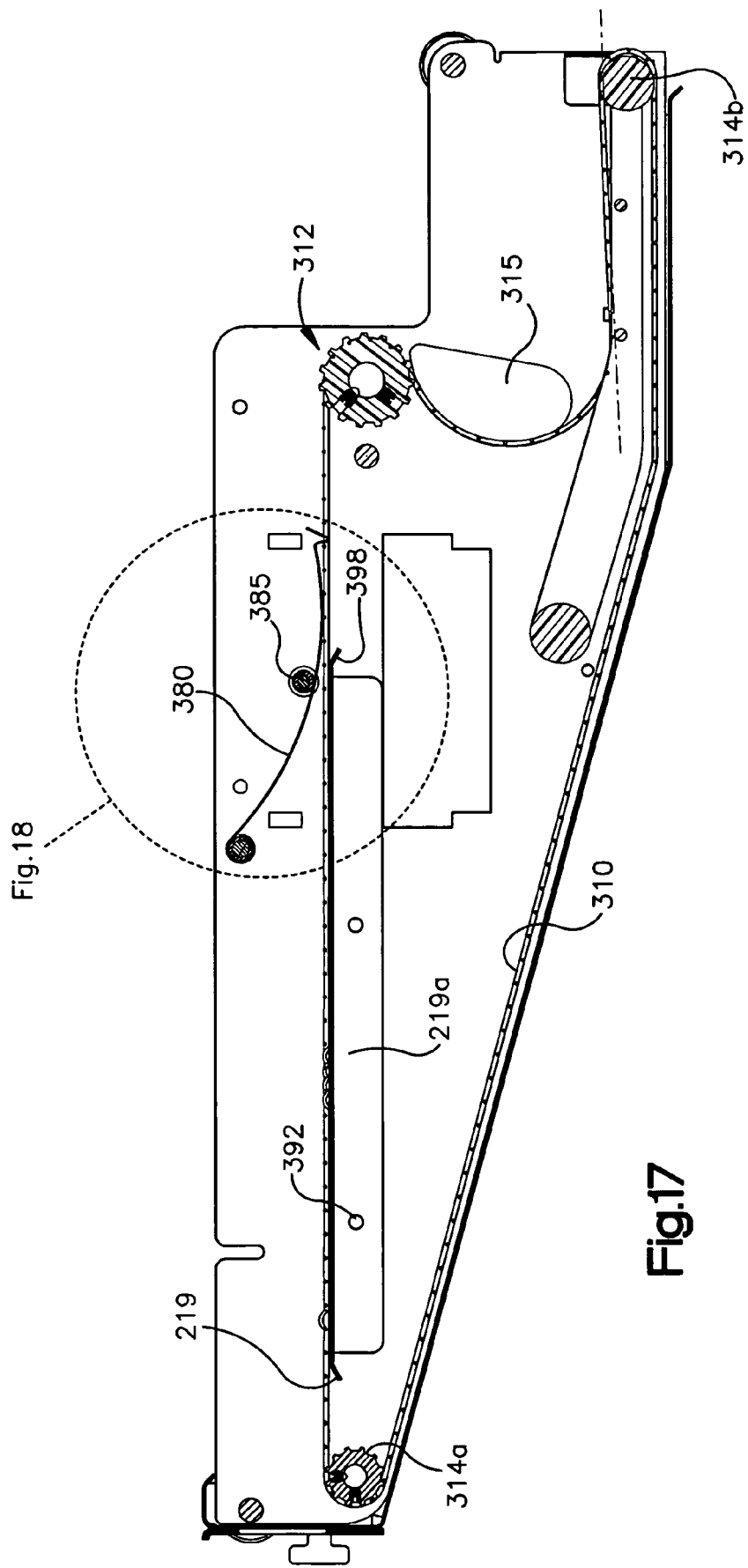
FIG. 17 is a view of the machine defined by the plane 17-17 in FIG. 6.

The tie rod 244d extends between the side frame ends remote from the hub 240 and defines an external surface that is shaped to guide the belt 234 around the end of the conveyor section 220. The tie rod has pins 270 that extend through an L-shaped slot 272 in the side walls of the conveyor 220 The L-shaped slot has a short downwardly extending portion into which the pins seat during operation of the conveyor 220. During idle times of the machine the conveyor can be cleaned by lifting the tie rod 244d up and sliding the pins at either end of the tie rod back through an elongated extent of the slot toward the hub 240. A fully retracted position of the tie rod 244d is illustrated in FIGS. 10 and 11. This position relaxes the belt tension for either cleaning or servicing of the conveyor 220. Occasionally during the batter/breading cycle of food products, smaller products slip through the openings in the belt 234 and are trapped inside the belt loop shown in FIG. 8. Use of the slotted side walls allows the operator to relax tension in the belt so that he or she can retrieve and clean this conveyor section more quickly and easily. Also the ability to relax the tension in the belt allows the components of the conveyor 220 to be serviced more quickly.

The side walls of the conveyor bend outwardly at their top to achieve a funnel effect for products delivered from the battering unit. Each of the two side walls has a relatively vertical lower section 242a that bounds the belt and an angled upper section 242b that funnels the food product from the battering unit as the food is dropped by the discharge portion of the battering unit conveyor. In the illustrated embodiment of the invention the angle between the vertical and the sloped or angled upper portion of the wall is 30 degrees. It is believed that other angles are possible and angles between 45 and 15 degrees of slope are preferable. Angles of between zero and 90 degrees are possible. The greater the angle, the wider the food channeling region but too wide an angle could result in food product collecting along an inner portion of the conveyor wall.

The conveyor section 220 is manually assembled to and removed from the tower 134 by relatively rotating the hub flange 240 so that the studs 254 that extend from the tower are released from the keyhole slots 253 in the hub flange 250. The conveyor section 220 is then pulled laterally away from the tower 134 so that the shaft assembly 232 is removed from its connection to the drive shaft 144.

The conveyor section 222 operates to direct food items and breading to the breading station 206, discharge the breaded food items from the machine 10 and recirculate the unused breading material through the breading unit. As noted, the conveyor section 220 is angled downwardly with its discharge end located adjacent the conveyor section 222. The conveyor section 222 is located immediately adjacent the discharge end of the section 220 and operates to create a flow of breading material out of the bottom of the breading reservoir 200, past the discharge end of the conveyor 220 and into the breading station. The food products discharged from the conveyor 220 are gently deposited onto the flow of breading material that is passing by on the conveyor section 222.

The illustrated conveyor section 222 is multi-tiered, providing an upper run that conveys both breading and food products to the breading station 206, a lower run onto which breaded food products are dropped from the upper run and which then conveys the breaded products to a discharge location at the machine end 110. The conveyor system also has a recycling run that extends along the base wall section 212 and the sloping wall 216 for conveying unused breading back to the reservoir for redelivery to the upper run. The illustrated conveyor section comprises a single belt 310, a belt drive shaft assembly 312 disposed in the reservoir 200 and detachably connected to the drive transmission 132 shown in FIG. 7, belt guides 314, 315 and a belt tensioner 313.

The conveyor belt 310 is illustrated as constructed like the belt 184 in that it comprises a wire mesh structure that supports the food products but permits breading to drop from the belt into the reservoir 200 at locations where the belt is not located over the breading supporting panel 219. While a wire mesh belt is illustrated, other forms of conveyor can be utilized so long as they perform the same function as the wire mesh belt, i.e. the conveyor moves the food products along the travel path beyond the breading station while enabling the unused breading to be returned to the breading reservoir without being discharged from the machine with the food products.

The belt drive shaft assembly 312 is located at the discharge end of the upper conveyor run so that the belt 310 is pulled across the panel 219 and through the breading station 206. The illustrated drive shaft assembly 312 comprises a shaft 316 that extends from the transmission 132 through the reservoir 200, bearings 318 supporting the shaft for rotation in the reservoir side walls, sprockets 320 fixed on the shaft for driving the belt, and a drive coupling 322 for detachably securing the shaft 316 to the drive transmission shaft 145.

The drive coupling is formed by telescoping end portions of the shaft 316 and the shaft 145. In the illustrated machine the shaft 145 has a female end opening (not illustrated) that defines a central bore with diametrically opposed axial slots extending from it. The shaft 316 defines a projecting male end (not illustrated) that is conformed to the shape of the female end opening and slides axially into the shaft 145 to provide a driving connection that transmits adequate torque to operate the breading unit conveyor section 222. The driving coupling also serves to maintain the breading unit 18 in proper alignment with the base frame 112.

A locking latch system 321 (FIGS. 2A-2E) is a way of locking the heavily loaded breader conveyors into their optimum operating positions. The breaders are designed with a tapered slope on the bottom surface or wall 216 which when combined with the weight of the loaded breader creates tremendous stress on the coupled shafts 145, 316 and bearings for those shafts.

The new latching system 321 redirects a reaction force equal to and normal to the downward force generated by the heavily loaded breader conveyors. A latch 324 in its locked position keeps the shafts in line concentrically, promoting smoother breader conveyor operation and reduces bearing and shaft wear. The Latch is mounted to a guide bearing housing 322 which is supported by the tower 138 without fasteners utilizing slots 326 and tabs 328. The latch 324 and can only be installed or removed when the slots and tabs line up with corresponding slots and tabs on the guide bearing housing 322.

Figure 2B:
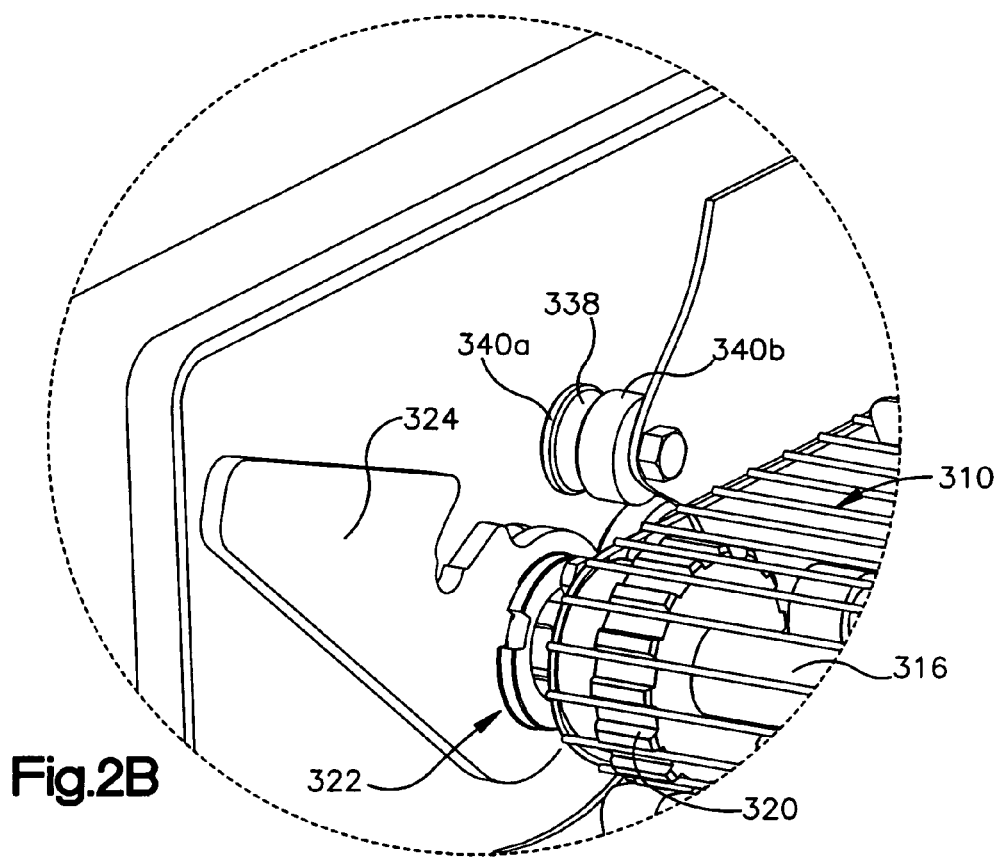
Figure 2C:
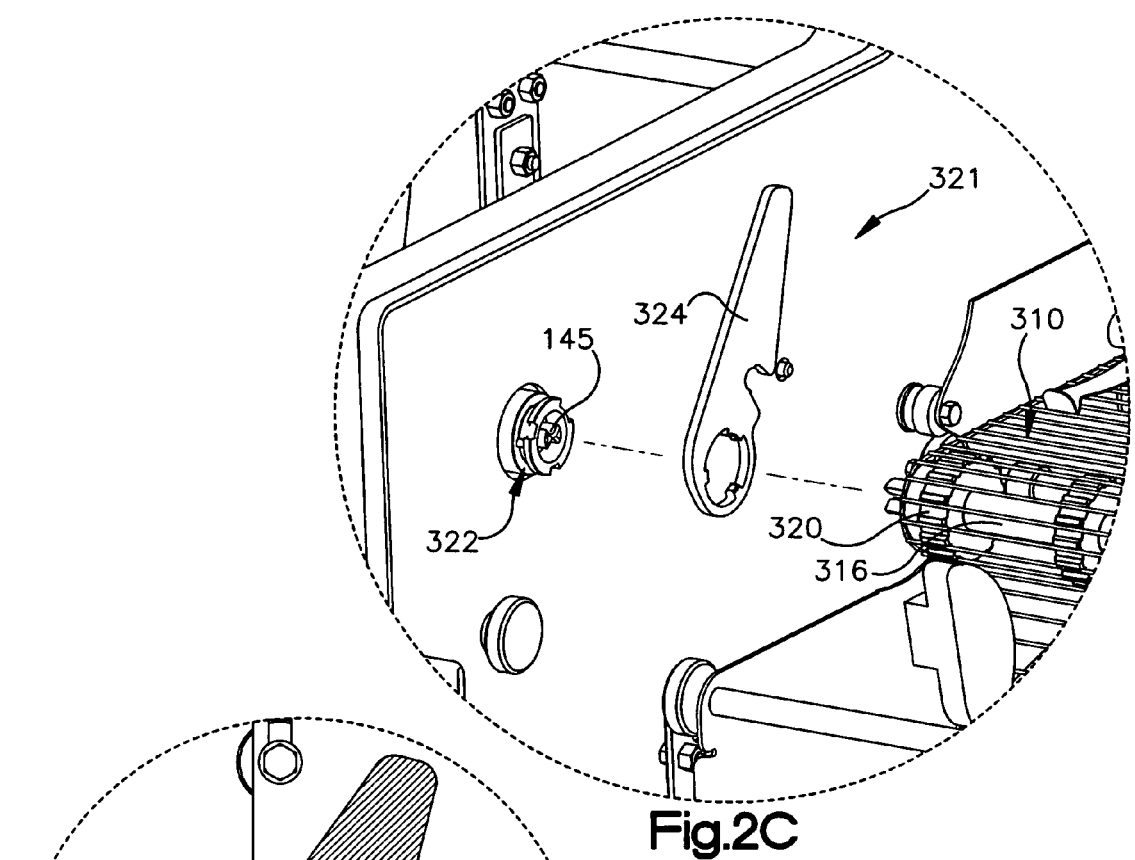
Figure 2D:
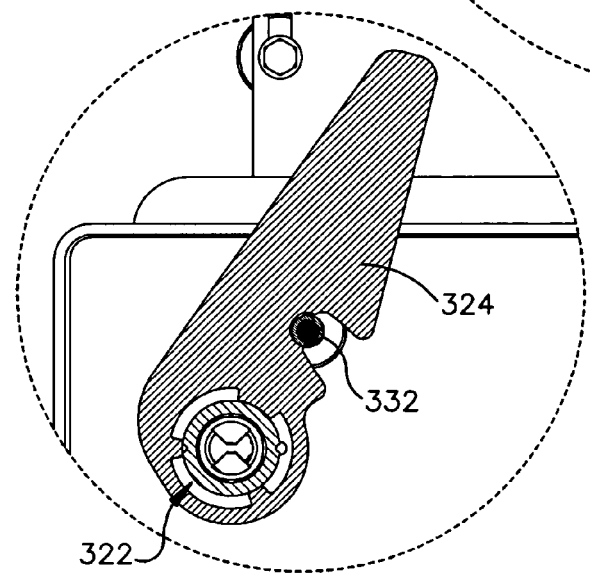
Figure 2E:
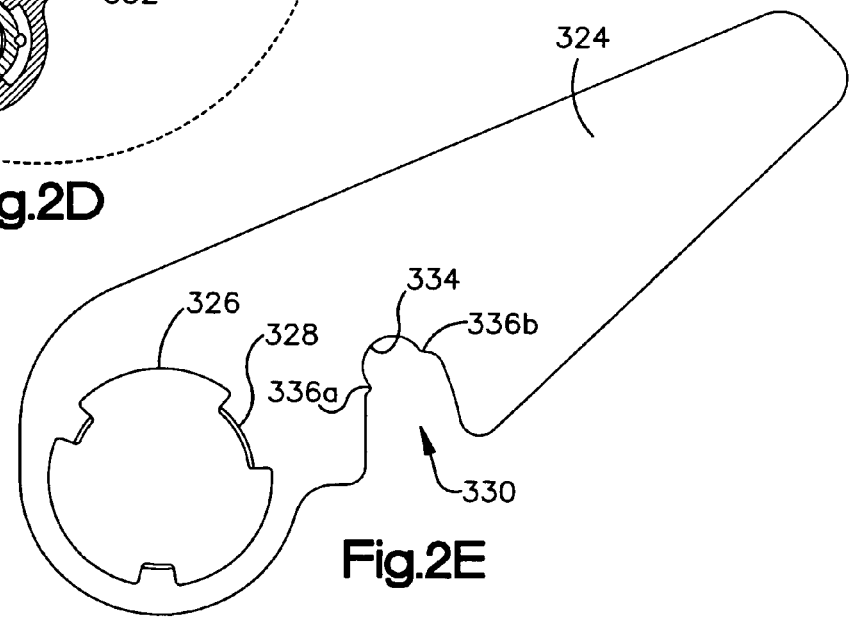
Figure 3:
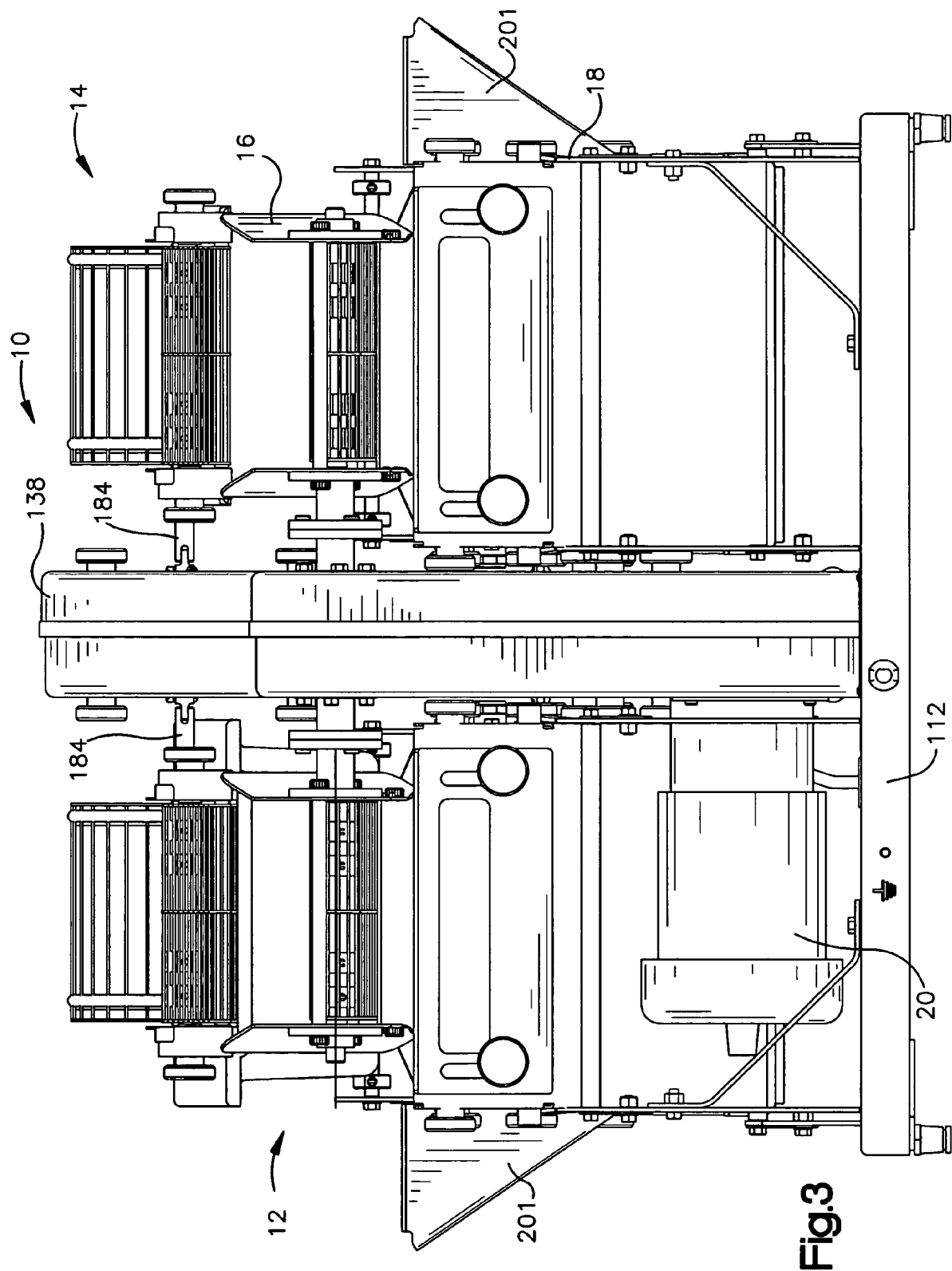
FIG. 3 is a rear elevation view of the breading machine of FIG. 1.
Figure 4:
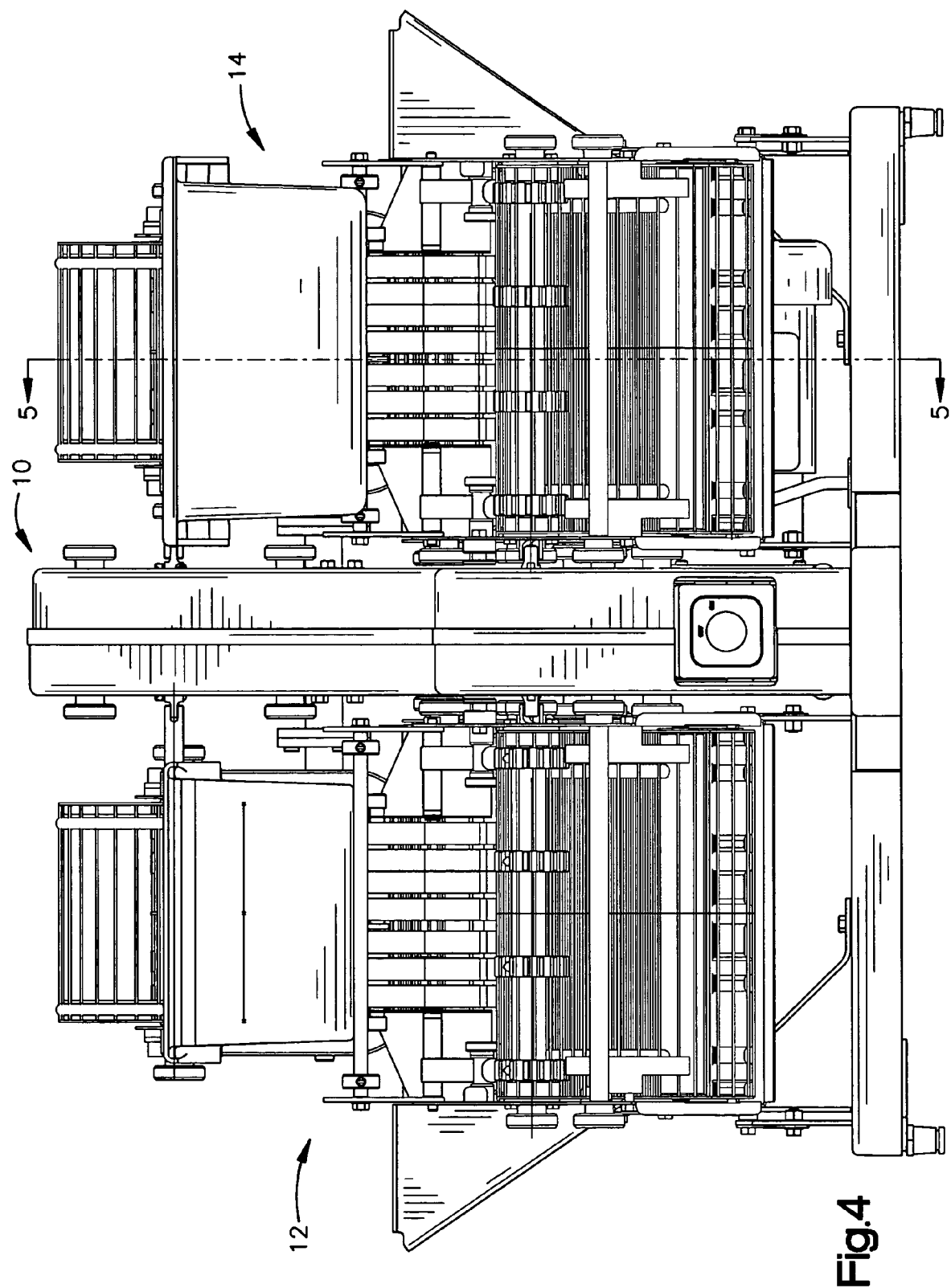
FIG. 4 is front elevational views of the food product breading machine of FIG. 1.

When installing a breader conveyor the latch is first rotated counterclockwise as seen in FIG. 2B and the shafts 145, 316 brought into driving engagement with each other. The latch 324 is then rotated clockwise to a position shown in FIG. 2A. The upward movement of the latch 324 brings a slot 330 into locking engagement with a shaft 332 supported by a side wall 211 of the breading reservoir 200. Turning to FIG. 2E, it is seen that the slot 330 terminates at one end by a rounded portion 334 sized to accommodate the shaft 332. An entrance to the rounded portion 334 is defined by means of two small detents or knobs 336a, 336b. As the latch is locked in place the shaft 332 seats securely in the rounded portion 334 and due to restraining action of these detents 336a, 336b keeps the latch from releasing during operation. An outer surface of the shaft 332 is exposed within a slot 338 defined by collars 340a, 340b attached to the side wall 211. If the latch were allowed to disengage during operation the breader conveyor could eventually pull from the drive shaft and the conveyor will stop running.

The belt guides 314, 315 together with the shaft assembly 312, train the belt 310 to define the conveyor runs and comprise an idler shaft 314a at the end of the run opposite to the shaft assembly, a pair of belt guiding elements 315 that direct the belt from the shaft assembly to the lower run, and a guide shaft, at the machine discharge end 110, around which the belt 310 is trained as it leaves the lower run and moves onto the recycling run.

The belt 310 moves upwardly along the sloping reservoir bottom wall 216 and around the idler shaft 314a in alignment with the shaft assembly on the upper run. The idler shaft thus defines an end of both the recycling run and the upper run. The illustrated idler shaft is an undriven rotatable shaft that extends laterally across the reservoir 200 adjacent the end wall 214 and carries sprocket wheels that run in mesh with the belt 310. The shaft is supported in bearings that are mounted in the sidewalls 211 of the reservoir 200.

The belt guiding elements 315 guide the belt 310 off of the drive shaft assembly 312 and train the belt along a smooth re-entrantly curved path—i.e. curved oppositely from the belt curvature as it passes around the shaft assembly 312—from the shaft assembly 312 to the lower run. The reverse curvature of the belt proceeding from the shaft assembly 312 assures that food products passing the drive shaft assembly 312 on the upper run fall onto the lower belt run. Each of the two spaced elements 315 is formed by a curved plastic plate that is attached to a respective reservoir side wall 211 below the shaft assembly 312. The elements 315 thus engage the opposite side edge portions of the belt.

The guide shaft 314b is a rod-like member that extends between the side walls 211 at the open reservoir end 110. The illustrated shaft 314b is constructed from stainless steel and has an outer surface defined by a series of cylindrical lands that are smooth to allow the belt 310 to pass around the shaft 314b with minimal friction. The shaft 314b has an axially extending mounting pin 317 at each end by which the shaft is supported by the side walls. As illustrated, a base wall 120 (FIG. 1) at the open reservoir end 110 terminates short of the ends of the side walls 211 so that food products passing the shaft 314b drop out of the machine end 110 beyond the base wall section.

The belt tensioner 313 maintains the belt tension relatively constant during operation of the machine 10. The illustrated tensioner comprises a belt engaging tensioning member that is resiliently biased into engagement with the belt on the recycling run, tensioning member support arms mounting the member to the reservoir, and links that extend between the tensioning member and the shaft 314b for shifting the shaft position relative to the reservoir as the belt tensioning member 200 changes position. Additional details concerning operation of the belt tensioner are found in the Whited et al '170 patent which is incorporated herein by reference.

The belt 310 sweeps unused breading material adjacent the wall section 212 and the sloping bottom wall 216 upwardly toward the end wall 214 where the breading material wells up and is conveyed by the belt in the upper run across the panel 219 toward the breading station 206. In the illustrated machine 10, the flow of the breading up and out of the reservoir is directed so that spillage does not occur and the material is distributed across the panel 219 in a pattern that facilitates complete coverage of the food items at the breading station. As illustrated, the uppermost side of the end wall 214 is provided with a flange 332 that extends the width of the end wall and projects into the reservoir 200 so that breading material that wells up from the bottom of the reservoir does not spill out of the reservoir over the end wall.

A breading flow control system controls and restricts the passage of breading material through the breading station 206 without impeding the movement of food products. Food products passing through the breading station are inundated by breading material. The breading flow control system comprises a breading diverter 350 for forming the breading material as the conveyor moves the material toward the loading location and a breading flow restrictor 352 for creating a standing wave of breading material at the station 206.

The illustrated diverter 350 is formed by a breading plow that projects from the conveyor section 220 toward the upper run of the conveyor 222 to produce a smooth flat bed of the breading material passing under the end of the conveyor section and continuous parallel breading mounds forming opposite lateral sides of the breading material bed. The illustrated plow comprises a plate-like rectangular member having a projecting side that extends into the breading material being moved by the conveyor 222, so that some of the breading flow is diverted around the opposite plow plate sides to form the mounds. The plow is attached to the conveyor section by tabs 360 that project from opposite sides of the plate-like plow member through slots in the conveyor section side frames 242.

The breading flow restrictor creates the standing wave of breading material at the breading station through which the food products are conveyed. The flow restrictor 352 comprises wall sections 362a, 362b that extend over the upper conveyor run and the panel 219 to direct the breading material in a convergent flow pattern toward the breading station, and a plurality of breading flow restrictor members 244 respectively supported above the upper conveyor run 170 at the breading station for maintaining a fluidic mass of breading material at the breading station.

The illustrated side wall sections each have a convergent portion 362a that interacts with the breading material flowing along the upper run. The convergent sections interact with the breading material so that the mounds of breading are channeled inwardly toward the center of the upper run and break like waves over food products approaching the breading station. The side walls have parallel extending portions 362b that extend from the inner ends of the convergent portions through the breading station 106. The side walls 240, 242 are fixed in position with respect to the breading station with the parallel wall portions 362b forming a throat section through which most of the breading and the food products are directed.

The illustrated machine employs two rows 372, 374 of restrictor members 370 that are supported between the side walls 362 at a throat section. Each restrictor member defines a surface 370a biased toward the upper conveyor run. The surfaces of each row of restrictors are disposed adjacent each other proceeding laterally across the station. The surfaces are aligned normal to the travel path. When the surfaces 246 of each row are horizontally aligned and adjacent the belt, they collectively provide a virtually continuous obstruction to breading material that would otherwise pass unobstructed through the station 206 above the level of the belt. The surfaces are biased toward the conveyor by the weight of each member.

The surfaces 370a mound the breading material just upstream from the station 206 to create the standing wave of the material. When sufficient breading material has mounded upstream from a restrictor member 370, the breading material pressure exerted on the member raises the member from the conveyor and breading material passes under the member from the breading station. The amount of breading material passing under any member depends on the conveyor speed, the breading material consistency, and the member weight and position. The conveyor speed is relatively constant so an equilibrium state typically is reached where a relatively constant amount of breading material flows under a given restrictor member.

When a food item moves into the station, those restrictor member surfaces that engage the item shift upwardly and move in conformity with the food item profile as it passes the raised restrictor member. The restrictors thus operate to tamp the passing food item without interfering with food item movement. At the same time the restrictor members that pass over a food item at the breading station obstruct nearly all but a surface coating of breading material from passing through the station 206 on the food item. Restrictor members that do not engage the food item remain in their initial, equilibrium positions adjacent the belt.

In addition to their individual tamping and breading flow restricting functions, the restrictor members collectively act to compress the breading material against the food products at the application station. Because of the fluidic nature of the breading material moving along the conveyor, the restrictor members pressurize the breading material as it is moved into the throat section and, in effect, pack the breading against the food item even at locations along the lateral sides of the products where a restrictor member is not tamping the item.

In the illustrated machine 10 the restrictor members of each row of restrictors are pivoted about a respective common axis extending between the side walls. In the illustrated machine, pivot shafts 376 are detachably carried in respective sidewall notches and each pivot shaft extends through a conforming hole in each restrictor member of the row. As the restrictor members engage the food products, the surfaces ride over the products as the restrictor members pivot about the axis of the pivot shafts at their remote ends. An additional notch is provided so that the angularity between the restrictor members and the conveyor can be adjusted by repositioning the pivot shafts between alternative notches. This changes the restrictor member biasing forces and alters the breading material pressure at the breading station.

The panel 219 extends under the upper conveyor run at the breading station 206. When the food products emerge from the breading station, most of the breading material that moves along with the food products is no longer supported by the panel 219 and drops through the conveyor belt to the bottom of the reservoir 200. Some breading emerging from the breading station may cling to the conveyor belt wires. Further, when the breading material is dampened from batter, clumps of the material tend to bridge the wire mesh forming the belt and may not automatically fall into the reservoir. In the illustrated breading unit, spring leaves 380 are resiliently biased against the belt and repeatedly strike the belt as it moves. The repetitive spring leaf impacts on the belt 310 vibrate the belt and dislodge breading material from the it. The spring leaves are supported and tensioned by pins 382 that project from the side walls. The spring leaves are removable from the unit by sliding them off of the pins.

Figure 18:
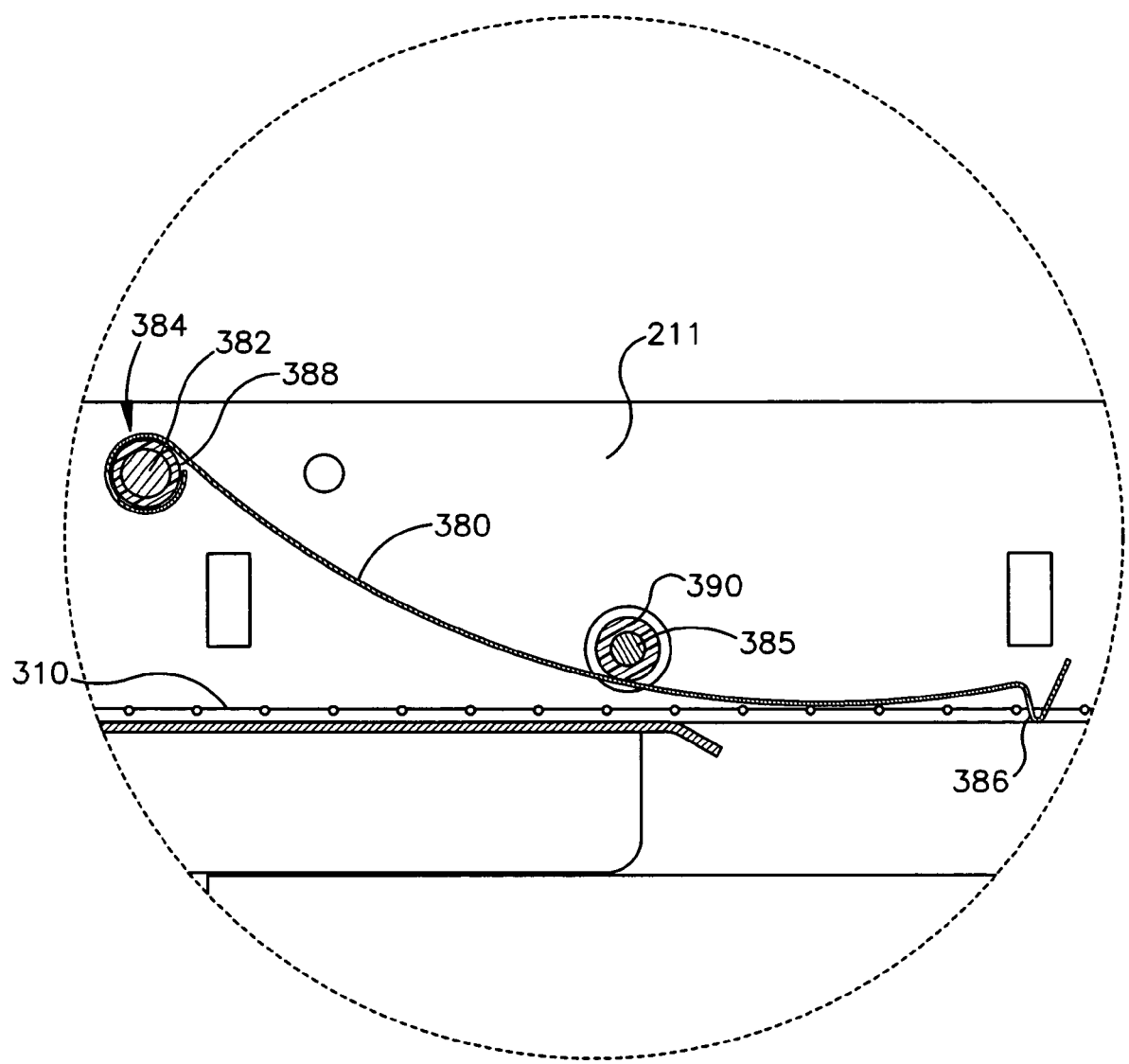
FIG. 18 is an enlarged view of the region of the machine depicted in FIG. 17.
Figure 19:
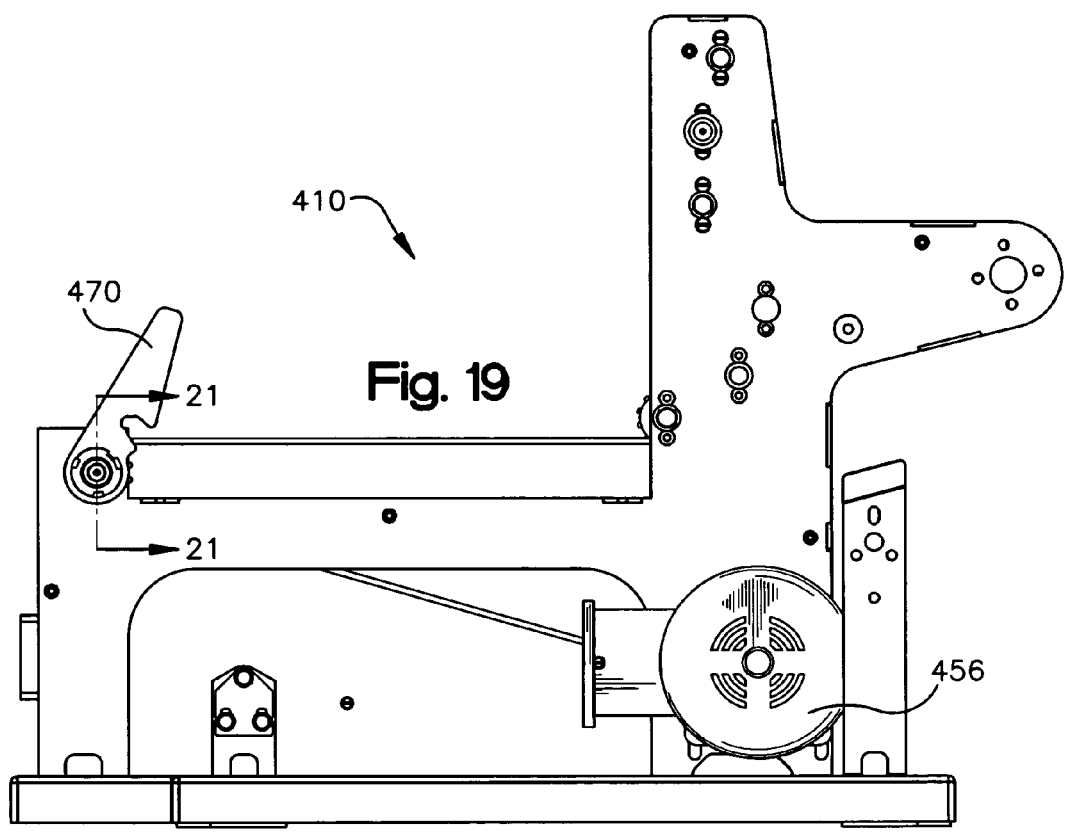
FIG. 19 is a side elevation view of a housing supporting an alternate drive system for one or two breading units.
Figure 20:
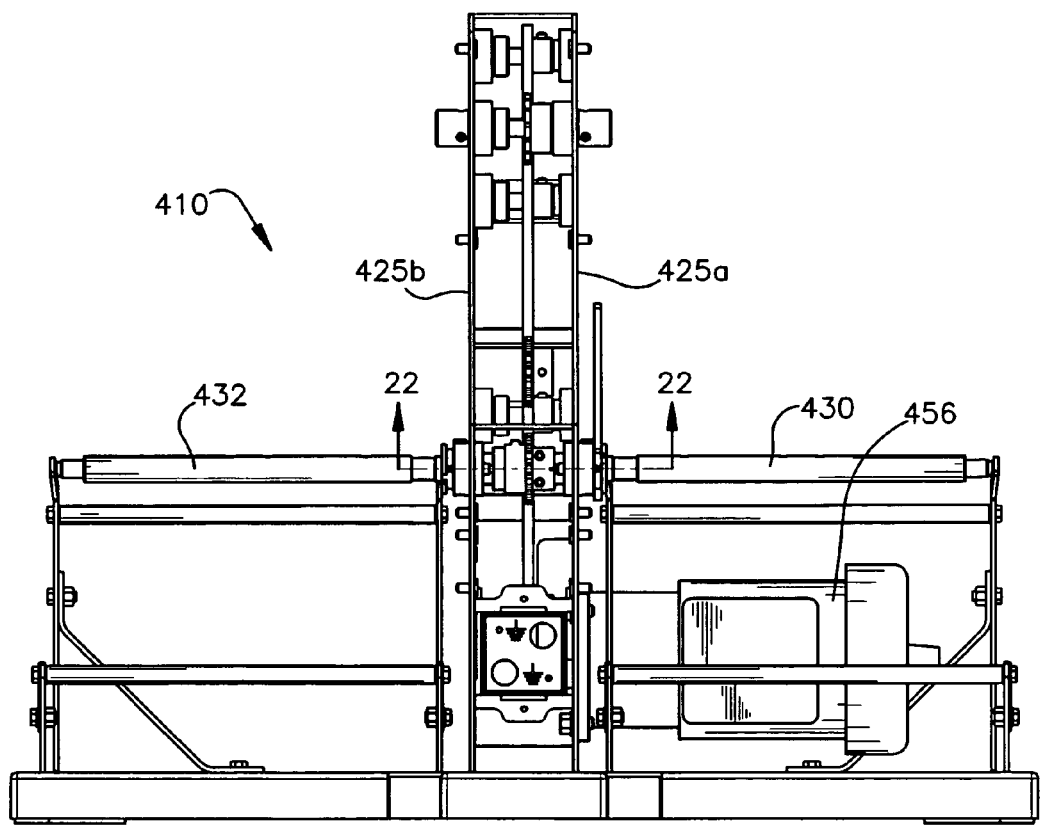
FIG. 20 is a front elevation view of the housing of FIG. 19.

Turning to FIG. 18, each of the two springs 380 has a loop 384 at one end which slips over the pin 382. At an opposite end, the spring defines a sharp bend 386 which fits down between the links of the belt 310. Between the loop 384 and the bend 386 the spring is stressed means of engagement with a post 385 which extends inwardly toward the top run of the conveyor belt 310 from a sidewall 211. As the sharp bend rides up and over a link in the belt it is stressed even further. As the bend 386 passes over a link, it snaps back to a position between lines and strikes an upper surface of the wall 219. This causes breading trapped between links to vibrate and separate from the belt 310.

The vibration and disloging of breading in prior art systems created noise. The disclosed system muffles the noise generated through use of an overmolded layer 388, 390 of elastomeric material that covers an outer surface of the pin 382 and the post 385. In the exemplary embodiment, the layers 388, 390 are a thermoplastic rubber material.

Figure 6:
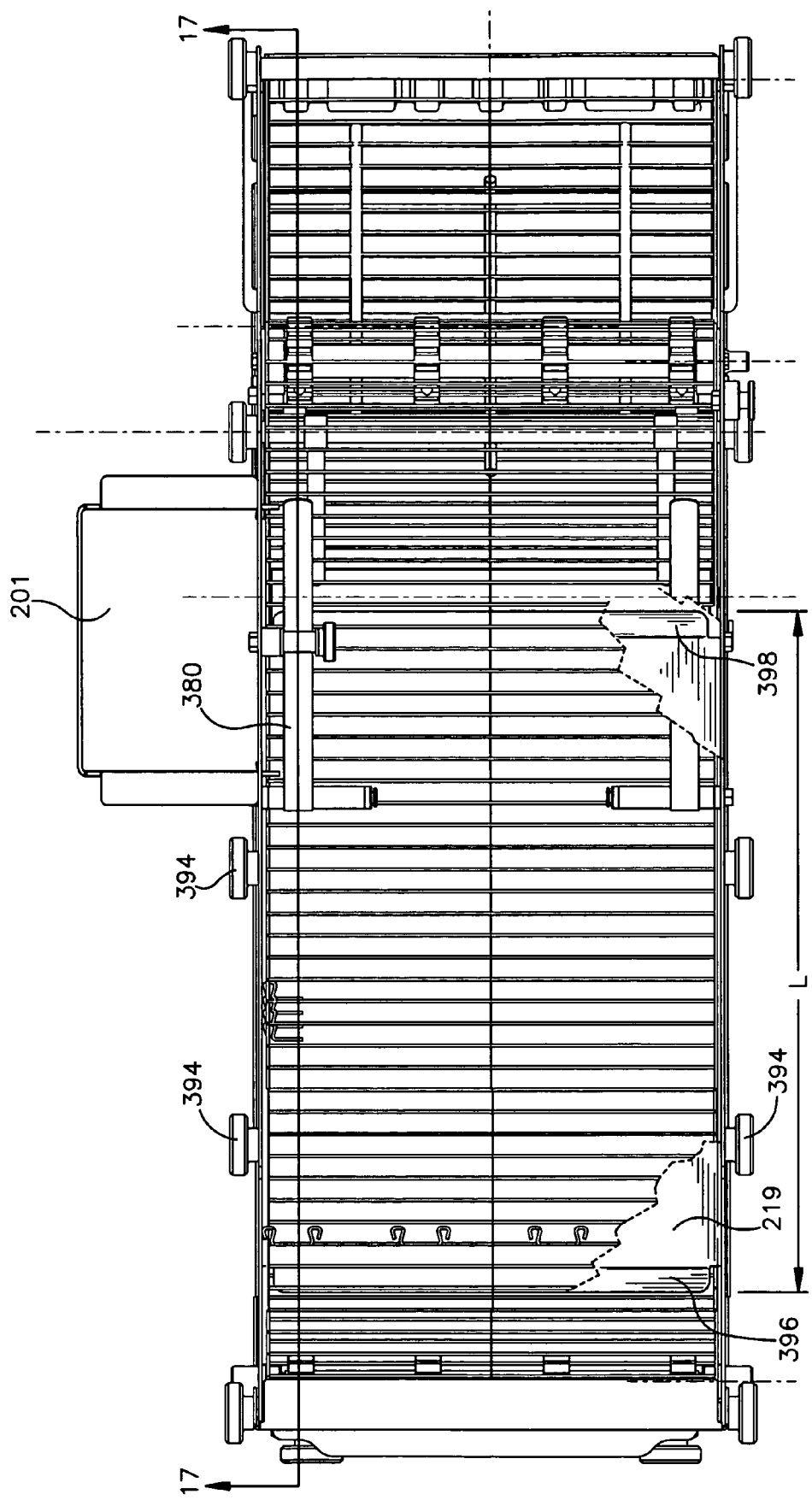
FIG. 6 is top plan view of part of the machine of FIG. 1 with parts removed.

Experience with the prior art machine disclosed in the '170 patent indicates that the length L (FIG. 6) of the upper wall 219 plays a part in correct operation of the machine and more particularly can affect the manner breading is applied to the food product. To some extent proper operation is a trial and error process wherein different lengths are chosen. As illustrated in the Figures the wall 219 has a generally smooth flat surface over which the belt 310 extends during breading operations. The wall 219 has side flanges 219a that extend downwardly. Each of the flanges 219a has threaded studs 392 that project outwardly away from the wall 219 and can be passed through appropriately spaced openings in the side walls 211 of the reservoir 200. Once the studs pass through the side walls, threaded connectors 394 are threaded onto the studs to hold the wall 219 in place. This construction allows for simple removal of the wall 219 and replacement with a shorter or longer upper wall depending on breading performance. As seen in FIG. 6, one exemplary wall 219 extends from a position beneath the plow 350 to a position just past (in the direction of breading movement) the post 385 which stresses the leaf spring vibrator 380. As seen in FIG. 6, in this arrangement, the top surface extends on either side of the connectors 394 to downwardly extending lips or flanges 396, 398. Substitution of other walls is achieved by removing the connectors, which allow the reservoir to be disassembled.

Experience with the breading function indicating that in the region of the gap between the flange 396 and the plow 350, a shorter gap between the reservoir end wall and the flange 396 creates more pressure build up and may pump too much breading material onto the upper wall. By increasing the gap width of the opening O there is less restriction, less pressure build up and according less flow. At the other end of the wall or pan 219 by shorting the length the pan extends away from the breading station or zone 206 the dwell time of the contact between breading material and the food product is decreased. Thus, if the coating of breading is deemed too thick, one solution would be to shorten the length L and thereby decrease the time period the product is in contact with the breading material. This shortening could be made even more dramatic by removing a row 372 of the flow restrictor members 370.

Breaded food products sometimes tend to carry loose, excess breading on them after they have emerged from the breading station. The machine 10 is so constructed and arranged that the excess breading is removed from the products and recycled. After the breaded food products emerge from the breading station 206 they pass the drive shaft assembly and drop from the upper run to the lower run. Any remaining loose breading on the food products is shed as a result of the impact with the lower run belt. The loose breading falls through the belt and into the reservoir base section 212. The recycling run belt sweeps the accumulated breading from the base section 212 upwardly along the sloping section 216 from which it is conveyed through the breading station again.

The food products remaining on the lower run are discharged from the machine over the open end of the reservoir base section 212 as the food products pass the guide shaft. The illustrated machine 10 is constructed so that a frying basket may be positioned below the machine discharge end 110 for accumulating food products for frying. The basket and its contents can be placed directly into the fryer when a sufficient number of products have been accumulated. The small foot print and the machine architecture that permits loading and discharging food from the machine end 110 makes it possible and desirable to station the machine 10 adjacent the fryers. This feature provides for enhanced convenience and efficiency.

When frangible food products are breaded, they are discharged from the upper conveyor run directly into a fryer basket or other suitable container (not illustrated), or into the hands of a machine attendant. Food products, such as croquettes or other products that could break up on impact with the lower run, are accessible at the end of the upper conveyor run through the open end of the reservoir. A receiving container may be supported between the reservoir sidewalls 211 just beyond and below the shaft assembly and above the lower run. The frangible products are deposited gently into the container without damage.

According to the present invention emptying the reservoir of breading material is accomplished quickly and easily by use of the breading discharge mechanism without requiring lifting and manually dumping the reservoir and without the need for partially disassembling the breading machine conveyor drive system. The breading discharge mechanism that is constructed and arranged so that the breading material can be discharged from the machine into a receptacle without requiring the machine to be moved from its normal position. Additional details of discharge of breading materials from the reservoir are disclosed in the '170 patent to Whited et al.

FIGS. 19-28 depict an alternate embodiment of a food product breading machine 410 for coating food products with a particulate breading material that includes an improved drive system 412. Although not shown in FIGS. 19-28, as in the embodiment described above, the machine 410 has a battering unit such as the unit 16 shown in FIGS. 1-3 that applies a fluent batter to a food product. The battering unit has a batter reservoir and a battering unit conveyor system for moving food products through the batter reservoir that also discharges food product from the battering unit.

A breading unit 418 (see FIG. 24) attached to a machine housing 426 located beneath the battering unit applies particulate breading to the food product after the food product has moved through the battering unit. The breading unit includes a breading material reservoir 420, a breading station at which breading is applied to the food product and a breading unit conveyor 422 for moving food products received from the battering unit to the breading station.

Figure 24:
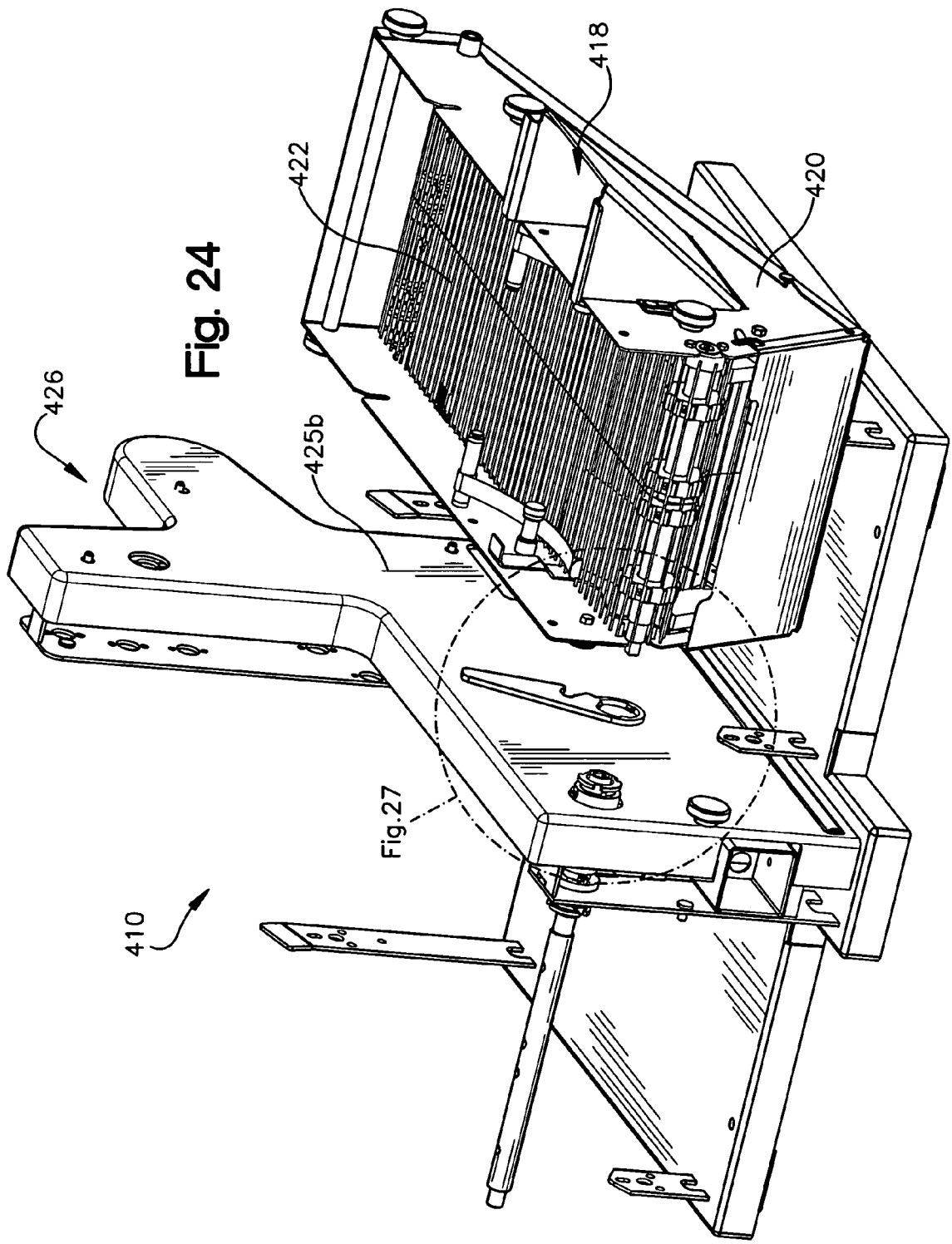
FIG. 24 is a perspective view of a breading unit attached to a machine housing which contains a drive system for a breading unit conveyor.
Figure 25:
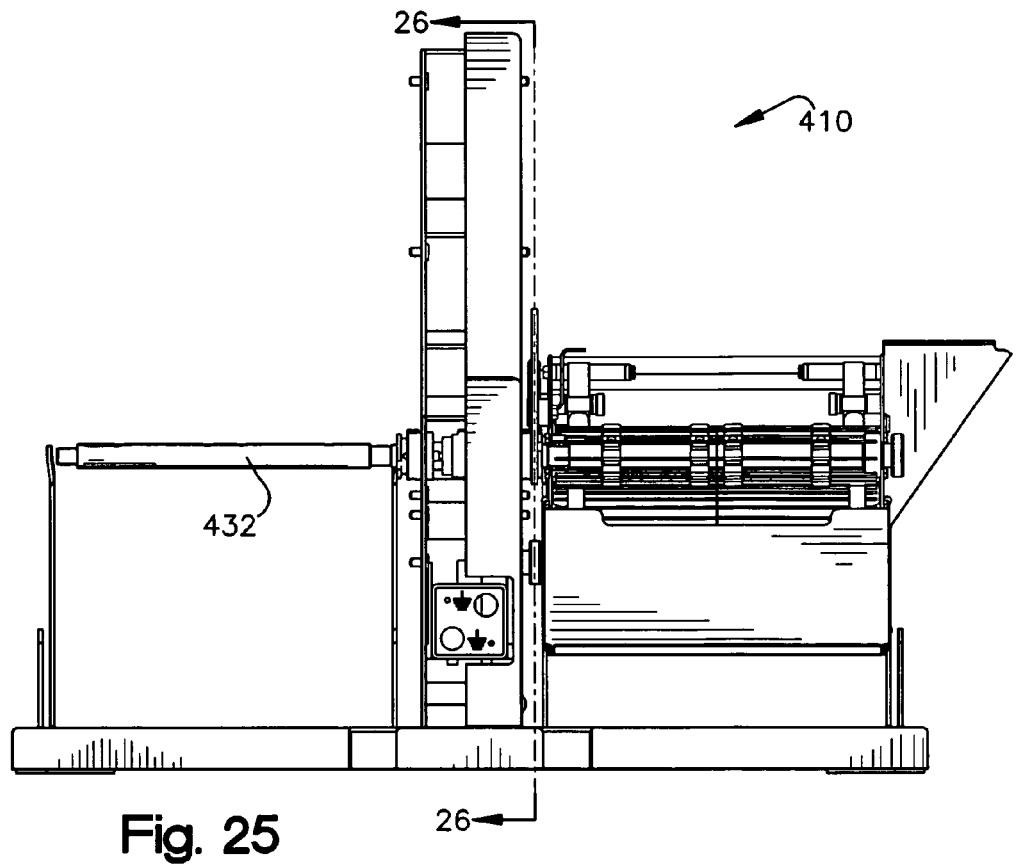
FIG. 25 is a partially sectioned view of a machine housing.
Figure 26:
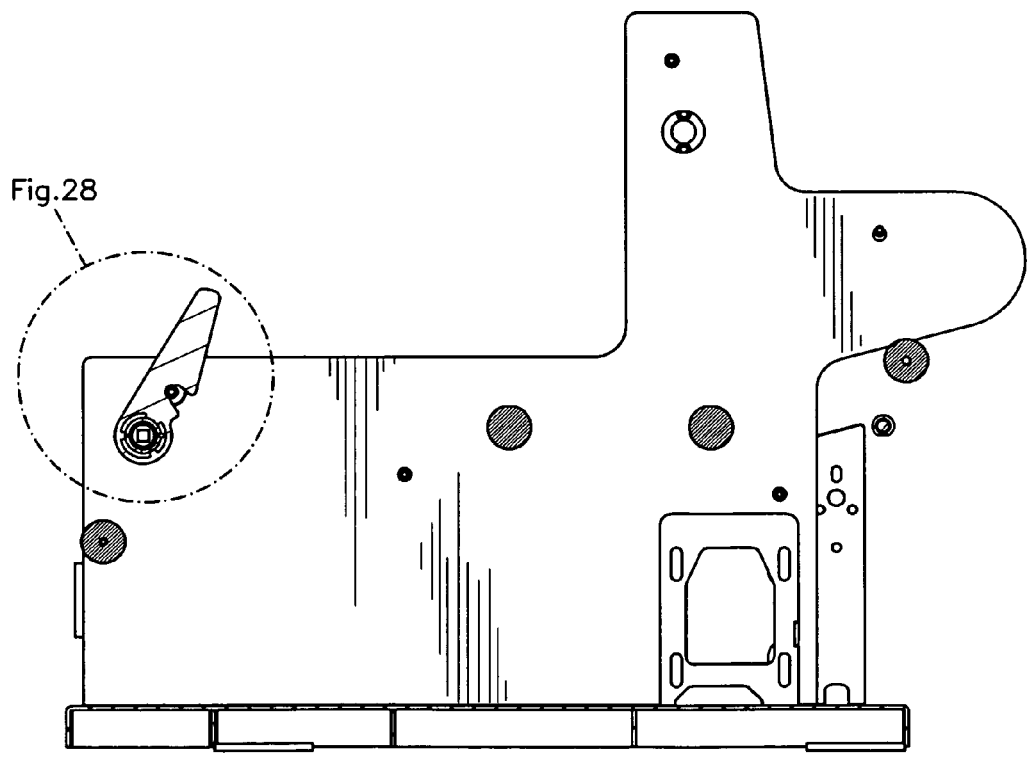
FIG. 26 is a view as seen from the plane defined by the line 26-26 in FIG. 25.

The breading unit conveyor drive system 412 includes a drive shaft 424 rotatably supported by sidewalls 425a, 425b of a machine housing 426. The drive system 412 provides motive power to the breading unit conveyor 422. In the illustrated embodiment, the drive system 412 can be coupled to first and second breading units on opposite sides of the machine housing. A complete depiction of one breading unit is shown in FIGS. 24 and 25. Driven shafts 430, 432 for each of two breading units are coupled to their respective breading unit conveyors 422 as they are rotated by the drive shaft 424 to move those breading unit conveyors.

As seen in the drawings, each of the driven shafts 430, 432 includes extensions 434, 436 at one end that are generally square in cross section. The machine drive system also includes two couplings 440, 442 that engage a non-cylindrical conforming surfaces 444, 446 at opposite ends of the drive shaft 424.

Figure 21:
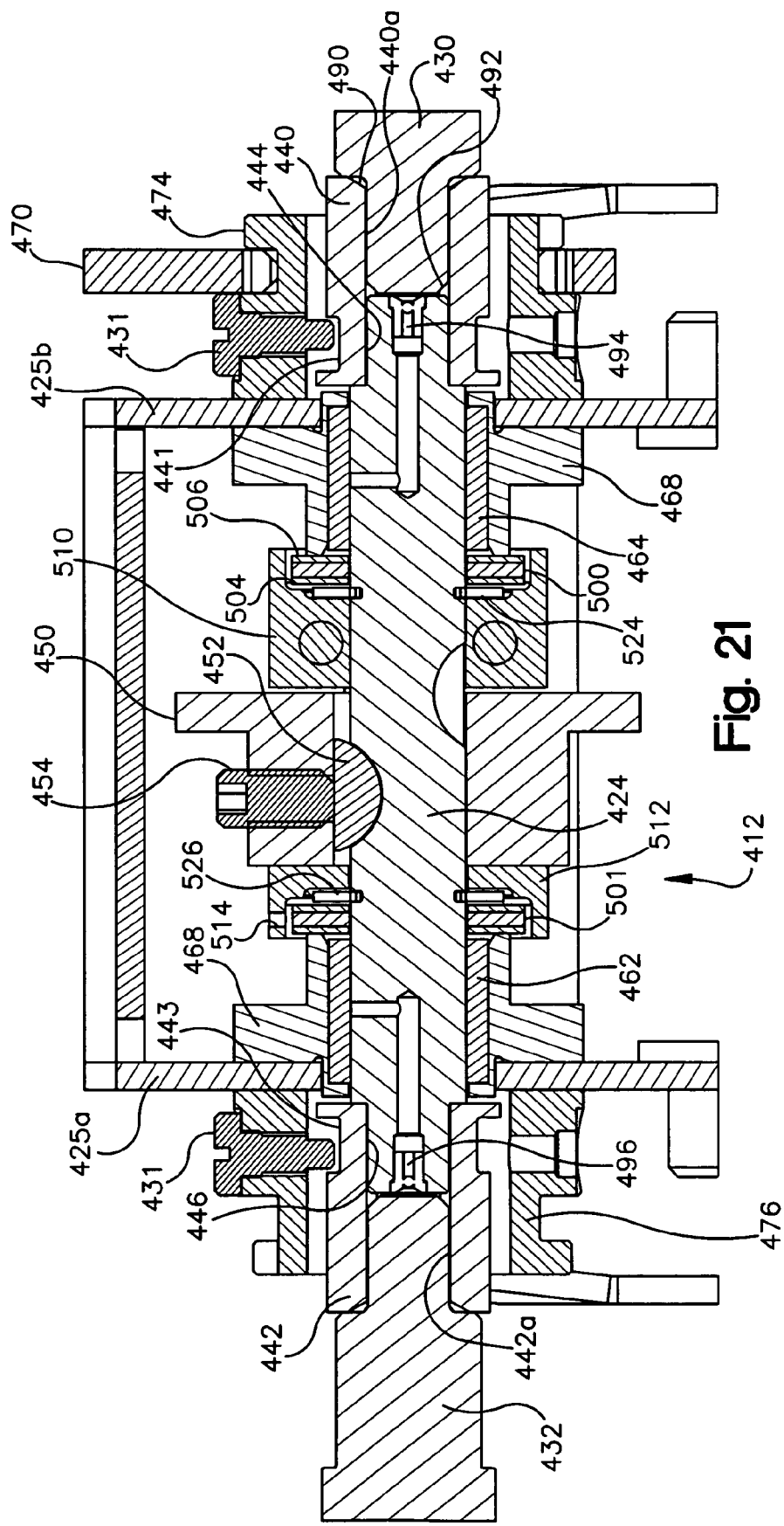
FIG. 21 is a section view as seen from the plane defined by the line 21-21 of FIG. 19.
Figure 22:
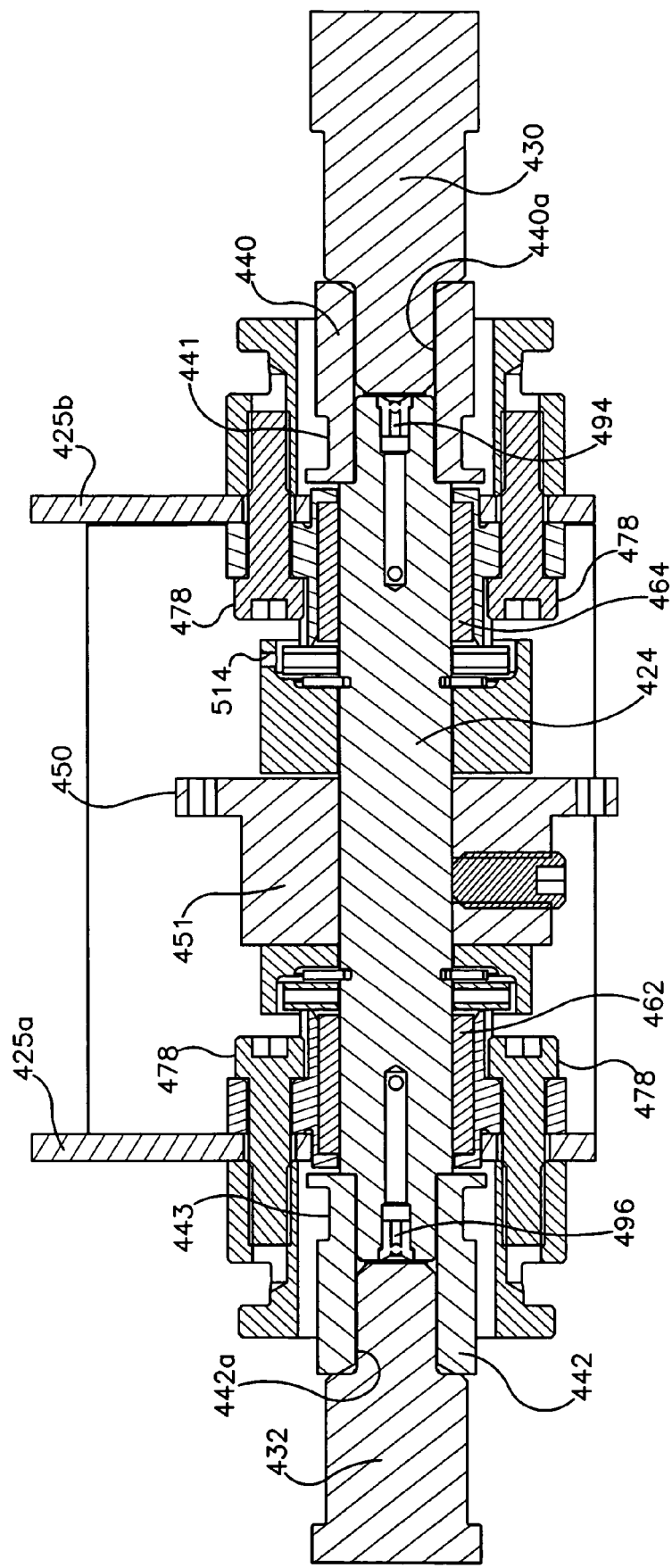
FIG. 22 is a section view as seen from the plane defined by the line 22-22 of FIG. 20.
Figure 23:
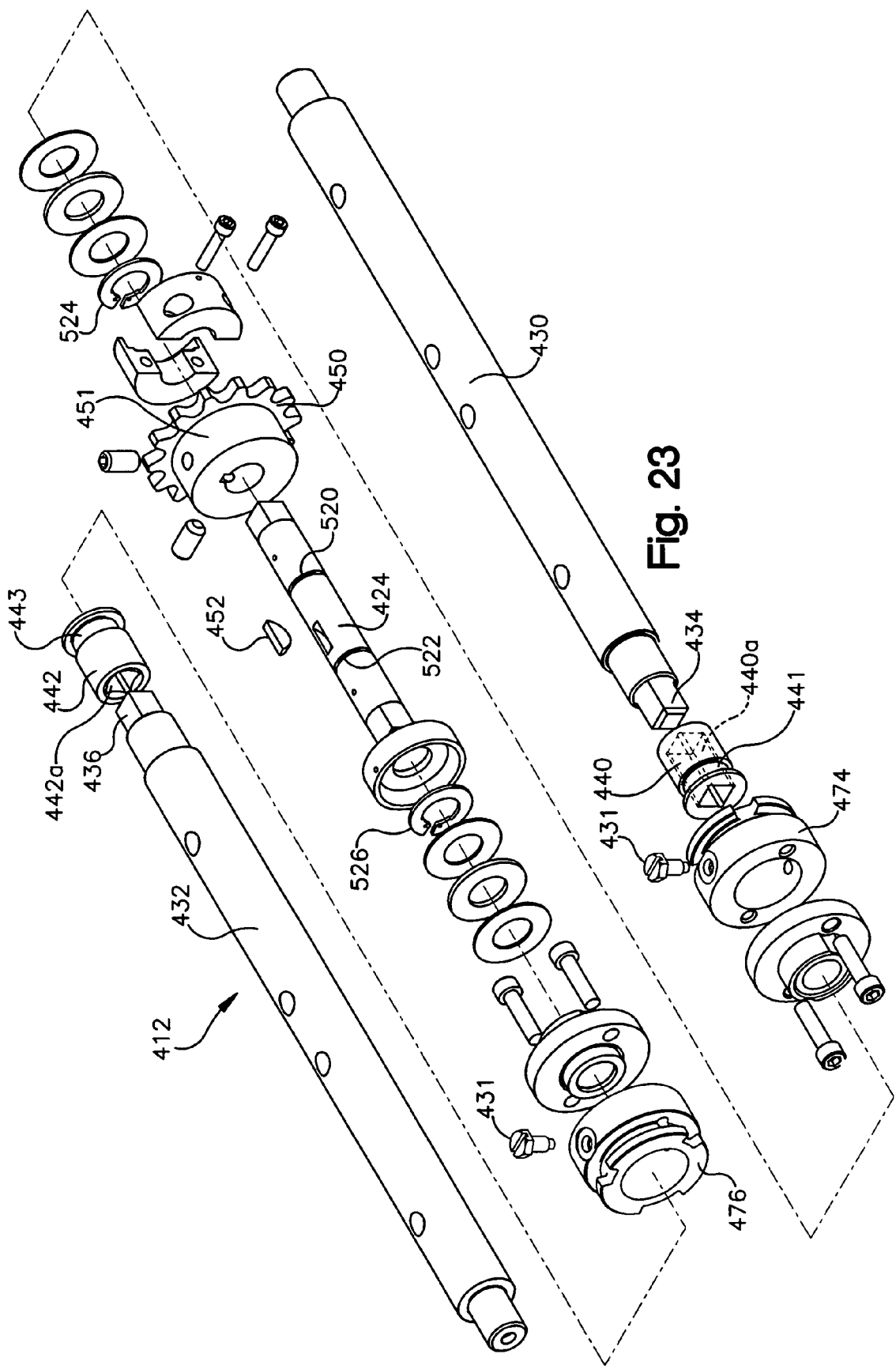
FIG. 23 is an exploded perspective view of an alternate drive system constructed in accordance with an alternate embodiment.

In the illustrated embodiment, each of the two couplings 440, 442 include a uniform four sided throughbore 440a, 442a wherein the four sides are of generally equal width and engage a conforming outer four sided surface of the driven roller extensions 434, 436. When the shaft 424 rotates, it transmits a torque to the two couplings 440, 442 which in turn impart torque to the driven shafts 430, 432. The couplings 440, 442 are held onto the machine by a screw 431 loosely fitting into respective grooves 441, 443 (FIGS. 21, 22). The only intent of these screws 431 is to prevent the respective pairs of couplings from falling off when the breading unit driven by that coupling is removed for cleaning.

Rotational motion is imparted to the drive shaft 424 by a driven gear 450 having a body 451 pinned to the drive shaft 424 by means of a woodruff key 452 that prevents relative rotation between the shaft 424 and the driven gear 450. A set screw 454 extends through the gear body 451 to engage the woodruff key 452 and secure the gear 450 to the drive shaft 424. A motor 456 (FIG. 20) supported by the housing 426 includes an output shaft that drives a gear which in turn drives a chain wrapped around over the driven gear 450. The motor 456 is a constant speed alternating current motor which rotates the drive shaft 424 and two driven shafts 430, 432 at constant speed (about 70 revolutions per minute) to impart movement to the breading conveyors 422. As described above the breading conveyors are constructed from belts such as the conveyor belt 310. The conveyors are made up of a wire mesh structure that supports the food products but permits breading to drop from the belt into the reservoir 420 at locations where the belt is not located over the breading supporting panel such as the breading support panel 219 described above.

The alternate machine 410 includes a bearing system that supports the single drive shaft 424 and includes first and second needle bearings 462, 464 spaced apart along an axis 466 of shaft rotation supported by the machine housing. A bearing body 468 supports circumferentially spaced needles within the body. The bearings 462, 464 are commercially available Timken needle bearings sold as Timken part no. JTT810.

The two breading units can easily be disconnected from the machine housing 426 for cleaning. During use of the breading machine the breading units are securely fixed to the machine housing by first and second rotating latches (only one of which 470 is shown in the drawings) that secure the breading units to opposite sides of the machine housing 426. The latches are pivotally mounted to latch housings 474, 476 that are secured to the housing by fasteners 478 which also secure the bearing body 468 to the side walls 425a, 425b of the machine housing 426.

In its locked position, the latch 470 keeps the drive shaft 424 and driven shaft 430 in line concentrically, promoting smoother breader conveyor operation and reduces bearing and shaft wear. As described above in relation to the latch 324, the latches can only be installed or removed when slots and tabs line up with corresponding slots and tabs on a latch housing.

Figure 27:
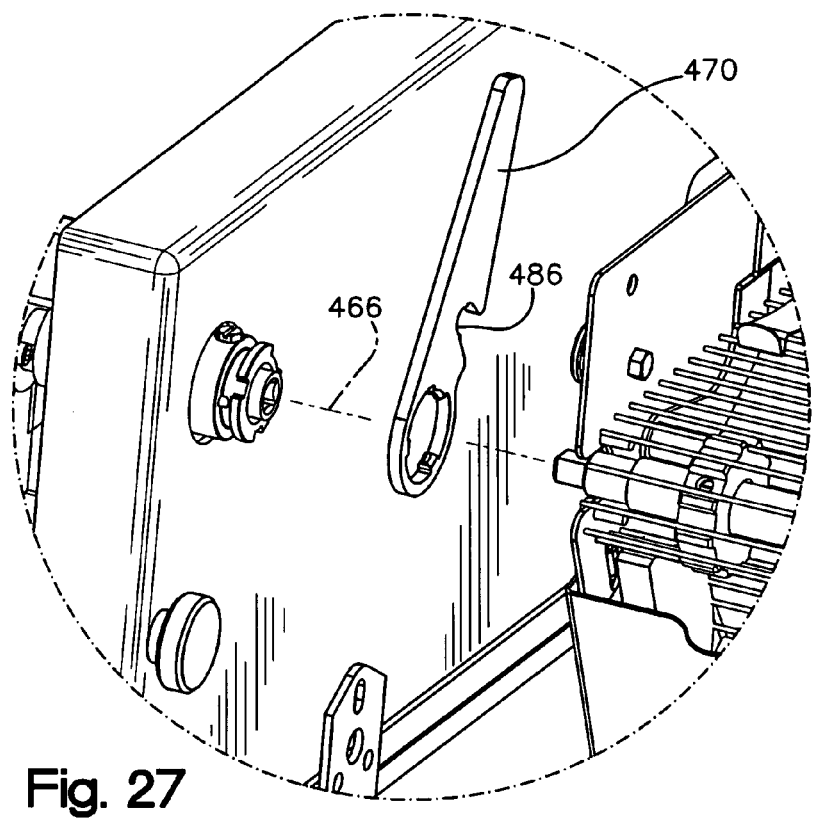
FIG. 27 is an enlarged view of a region delineated in FIG. 24.
Figure 28:
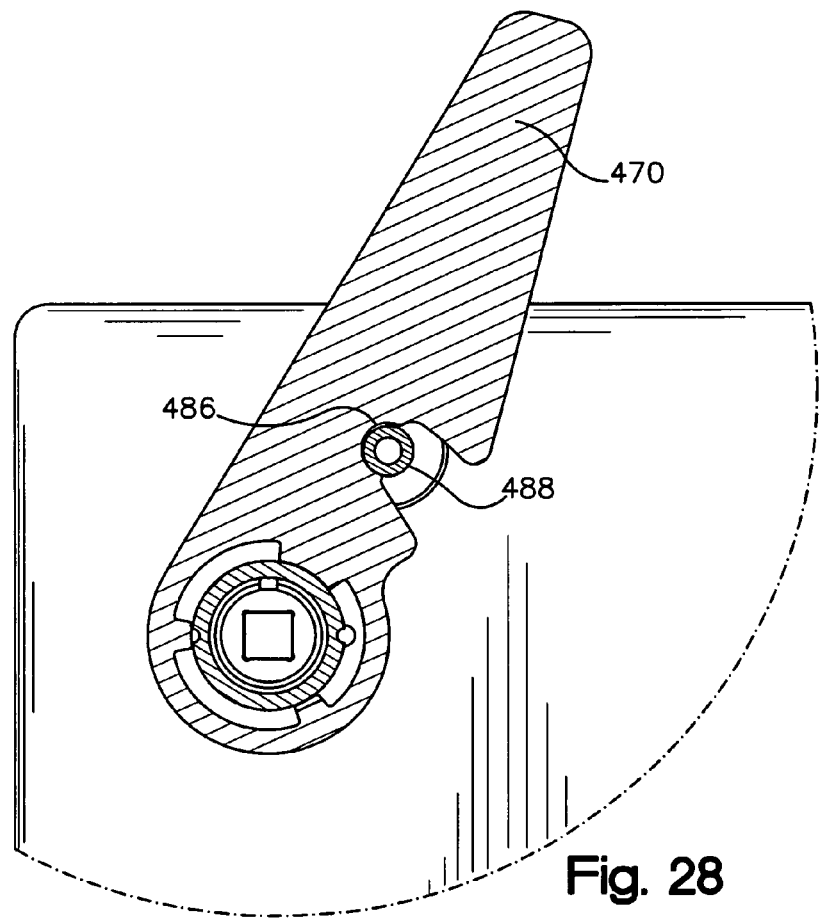
FIG. 28 is an enlarged view of a region delineated in FIG. 26.

When installing a breader conveyor the latch (470 for example) is first rotated counterclockwise as seen in FIGS. 27 and 28 and the shaft 430 of the breading unit brought into driving engagement with the coupling 440. The latch 470 is then rotated clockwise to a position shown in FIG. 28. The upward movement of the latch 470 brings a slot 486 into locking engagement with a shaft 488 supported by a side wall of the breading unit reservoir. Additional details regarding the latch are described above in relation to the latch 324.

While intended to be assembled with the motor not energized, experience with the combined battering/breading machine described herein indicates some users will assemble or attach a breading unit to the machine while the motor is running and hence the drive shaft 424 will be rotating. Although not necessarily recommended, the illustrated alternate embodiment better accommodates such an operation. As seen in the section view of FIGS. 21 and 22, the generally square sided coupling bore has a chamfered entrance 490 to facilitate insertion of the exposed end of the conveyor drive shaft 430. As also seen in the Figures, the conveyor drive shaft 430 has an outside chamfered surface 492. As the breading unit is positioned in relation to the machine housing 426, the chamfered surface 492 of the shaft 430 enters the bore 440a, 442a of the coupling 440, 442 more easily due to the chamfering.

The alternate embodiment depicted in FIGS. 19-28 includes a generally solid metal drive shaft 424 having lubrication fittings 494, 496 at opposite ends for delivering lubricant to a vicinity of the first and second needle bearings.

Prelubricated thrust bearings 500, 501 with hardened washers 504, 506 permit the engagement of the breading unit into the drive while the drive is still running. The thrust bearings allow side to side movement of the motor drive shaft 424 as either said first or second breading unit is brought into engagement with an associated coupling. Spacers or caps 510, 512 overlie the thrust bearings 500, 502 and include grease openings 514 for lubricating the thrust bearings.

An angular or chamfered entrance 490 to the square hole 440a, 442a allows the shaft 430 to more easily slide into the couplings 440, 442. By allowing the coupling to float on both shafts and have clearance between the couplings 440, 442 and shaft the design permits misalignment in all directions. The dimension and tolerance for the male square end of the shaft 430 is 0.351+/−0.0025. The dimension and tolerance for the female end of the couplings is 0.360+/−0.0015

The improved drive is easier to engage since the square shape of the roller extensions 434, 436 have more engagement possibilities then the prior art system that had two possible orientations. The cross sectional area of the shaft is maximized by using the square shape. There are four surfaces transmitting the torque compared to two with the prior art system.

The alternate embodiment has reduced service cost due the quick and easy replacement of the coupling. The coupling is designed to wear before the shafts wear and is made of a softer material. In the illustrated embodiment the drive shaft 424 is machined from hardened 440C stainless steel and the coupling from 17-4 Stainless which is a softer material.

Re-greasable needle bearings replaced plastic bushings used in the prior art. The bearings are sealed and covered to protect from water and dust intrusion. Assembly and service is easier and does not require adjustments. Fixed position snap ring grooves 520, 522 containing retaining rings 524, 526 that locate the position of the drive shaft 424. The retaining rings are bounded by the spacer caps 510, 512 locate the position of the shaft. Shaft is reversible so it can be assembled either direction.

While a single embodiment of the invention has been illustrated and described in considerable detail, the invention is not to be considered limited to the precise construction disclosed. Various adaptations, modifications, and uses of the invention may occur to those skilled in the business to which the invention relates. The intention is to cover all such adaptations, modifications, and uses coming within the spirit or scope of the appended claims.

The invention claimed is:

1. A machine for coating food products with a particulate breading material comprising:
   a) a battering unit for applying a fluent batter to a food product comprising a batter reservoir and a battering unit conveyor system for moving food products through the batter reservoir and then discharge food product from the battering unit;
   b) a breading unit for applying particulate breading to the food product after the food product moves through the battering unit comprising a breading material reservoir, a breading station at which breading is applied to the product and a breading unit conveyor for delivering food products received from said battering unit to said breading station; and
   c) a conveyor drive system comprising a machine housing and
      i) a drive unit rotatably supported by the machine housing that provides motive power to said breading unit conveyor, the drive unit including: a) a coupling; and b) a drive shaft supported by the machine housing, a first end of the coupling overlapping a surface of a first end of the drive shaft; and
      ii) a breading unit drive including a driven shaft coupled to the breading unit conveyor that is rotated by the drive unit to move said breading unit conveyor;
   d) wherein a second end of the coupling is connected to a first end of the driven shaft to rotate the driven shaft and further wherein one of the second end of the coupling and the first end of the driven shaft defines a non-cylindrical bore and the other of the second end of the coupling and the first end of the driven shaft defines a non-cylindrical outer surface sized to fit into the bore; and
   e) a latch pivotally coupled to the conveyor drive system drive unit and, in latched position, engaging a projection extending from a side wall of the breading unit to maintain alignment of the driven shaft of the breading unit drive and the coupling of the drive unit.

2. The machine of claim 1 wherein the non-cylindrical bore has four or less sides and the non-cylindrical outer surface has the same number of sides as the non-cylindrical bore.

3. The machine of claim 1 wherein both the non-cylindrical bore and the non-cylindrical outer surface have four sides.

4. The machine of claim 3 wherein both the non-cylindrical bore and the non-cylindrical outer surface are substantially square in cross section.

5. The machine of claim 1 wherein the bore includes a chamfered entrance to facilitate insertion of the first end of the driven shaft and the first end of the driven shaft includes a chamfer.

6. A machine for coating food products with a particulate breading material comprising:
   a) a battering unit for applying a fluent batter to a food product comprising a batter reservoir and a battering unit conveyor system for moving food products through the batter reservoir and then discharge food product from the battering unit;
   b) a breading unit for applying particulate breading to the food product after the food product moves through the battering unit comprising a breading material reservoir, a breading station at which breading is applied to the product and a breading unit conveyor for delivering food products received from said battering unit to said breading station; and
   c) a conveyor drive system comprising a machine housing and i) a drive unit rotatably supported by the machine housing that provides motive power to said breading unit conveyor, the drive unit including: a) a coupling; and b) a drive shaft supported by the machine housing, a first end of the coupling overlapping a surface of a first end of the drive shaft; and ii) a breading unit drive including a driven shaft coupled to the breading unit conveyor that is rotated by the drive unit to move said breading unit conveyor;
   d) wherein a second end of the coupling is connected to a first end of the driven shaft to rotate the driven shaft and further wherein one of the second end of the coupling and the first end of the driven shaft defines a non-cylindrical bore and the other of the second end of the coupling and the first end of the driven shaft defines a non-cylindrical outer surface sized to fit into the bore and further wherein a number of sides of the bore is four or less.

7. The machine of claim 6 further including a latch pivotally coupled to the conveyor drive system drive unit and, in latched position, engaging a projection extending from a side wall of the breading unit to maintain alignment of the driven shaft of the breading unit drive and the coupling of the drive unit.

8. The machine of claim 6 wherein a number of sides of the non-cylindrical outer surface is four or less and is the same as the number of sides of the non-cylindrical bore.

9. The machine of claim 8 wherein the number of sides of the non-cylindrical bore and the non-cylindrical outer surface is four.

10. The machine of claim 9 wherein both the non-cylindrical bore and the non-cylindrical outer surface are substantially square in cross section.

11. The machine of claim 6 wherein the bore includes a chamfered entrance to facilitate insertion of the first end of the driven shaft and the first end of the driven shaft includes a chamfer.

12. A machine for coating food products with a particulate breading material comprising:
   a) first and second battering units for applying a fluent batter to a food product, each of the first and second battering units comprising a batter reservoir and a battering unit conveyor system for moving food products through the batter reservoir and then discharge food product from the battering unit;
   b) first and second breading units for applying particulate breading to the food product after the food product moves through the battering unit, each of the first and second breading units comprising a breading material reservoir, a breading station at which breading is applied to the product and a breading unit conveyor for delivering food products received from said battering unit to said breading station; and
   c) a conveyor drive system comprising a machine housing and
      i) a drive unit rotatably supported by the machine housing that provides motive power to first and second breading unit conveyors of the first and second breading units ; and
      ii) a breading unit drive coupled to the first and second breading unit conveyors, the breading unit drive is rotated by the drive unit to move said first and second breading unit conveyors; and
   d) wherein one of said drive unit and breading unit drive defines a bore and another of said drive unit and breading unit drive defines a conforming outer surface sized to fit into said bore; and
   said first and second breading and first and second battering units positioned on opposite sides of the machine housing.

13. The machine of claim 12 wherein said breading unit drive comprises first and second breading unit drives coupled respectively to said first and second breading unit conveyors.

14. The machine of claim 12 wherein the drive unit comprises
   a) a drive shaft supported by the machine housing and
   b) first and second couplings that overlap conforming surfaces of the drive shaft and extend beyond outer surfaces of the machine housing for engagement with said first second breading unit drives.

15. The machine of claim 12 wherein the drive unit comprises a drive shaft and a bearing system that supports the drive shaft comprising first and second bearings spaced apart along a drive shaft axis of rotation that engage the machine housing.

16. The machine of claim 15 additionally comprising a sprocket mounted to the drive shaft that is rotated by a chain wrapped over the sprocket.

17. The machine of claim 15 additionally comprising first and second latches for securing the first and second breading units to either side of the machine housing.

18. The machine of claim 15 wherein the drive shaft is a generally solid metal shaft having lubrication fittings at opposite ends for delivering lubricant to a vicinity of the first and second bearings.

19. The machine of claim 15 additionally comprising first and second thrust bearings to allow side to side movement of the drive shaft as either said first or second breading unit is brought into engagement with as associated coupling.

20. The machine of claim 6 wherein the coupling is detachable from the drive shaft.

* * * * *

UNITED STATES PATENT AND TRADEMARK OFFICE
CERTIFICATE OF CORRECTION

PATENT NO. : 7,614,360 B2  Page 1 of 1
APPLICATION NO. : 11/235299
DATED : November 10, 2009
INVENTOR(S) : Muniga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Nineteenth Day of October, 2010

David J. Kappos
*Director of the United States Patent and Trademark Office*